(12) United States Patent
Takesue et al.

(10) Patent No.: US 9,787,874 B2
(45) Date of Patent: Oct. 10, 2017

(54) IMAGE PROCESSING APPARATUS WITH SHARPNESS DETERMINATION, INFORMATION PROCESSING APPARATUS, AND METHODS THEREFOR

(71) Applicant: CANON KABUSHIKI KAISHA, Tokyo (JP)

(72) Inventors: Naoya Takesue, Tokyo (JP); Hisashi Ishikawa, Urayasu (JP); Tomokazu Yanai, Yokohama (JP); Hiroyuki Sakai, Chigasaki (JP); Yoshinori Nakajima, Yokohama (JP); Hajime Nagai, Kawasaki (JP); Yumi Shimokodachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/075,574

(22) Filed: Mar. 21, 2016

(65) Prior Publication Data

US 2016/0295071 A1 Oct. 6, 2016

(30) Foreign Application Priority Data

Mar. 31, 2015 (JP) ................................. 2015-073216

(51) Int. Cl.
  *H04N 1/409* (2006.01)
  *H04N 1/407* (2006.01)
  *H04N 1/58* (2006.01)
  *H04N 1/60* (2006.01)

(52) U.S. Cl.
  CPC ......... *H04N 1/4092* (2013.01); *H04N 1/4074* (2013.01); *H04N 1/58* (2013.01); *H04N 1/6097* (2013.01); *H04N 2201/0082* (2013.01)

(58) Field of Classification Search
  CPC combination set(s) only.
  See application file for complete search history.

(56) References Cited

U.S. PATENT DOCUMENTS

| 5,115,241 | A | 5/1992 | Ishikawa |
| 5,436,981 | A | 7/1995 | Ishikawa |
| 6,084,984 | A | 7/2000 | Ishikawa |
| 7,432,985 | B2 | 10/2008 | Ishikawa et al. |
| 7,672,525 | B2 | 3/2010 | Ishikawa |
| 7,881,372 | B2 | 2/2011 | Ishikawa |
| 7,948,657 | B2 | 5/2011 | Yanai et al. |
| 8,085,427 | B2 | 12/2011 | Takasaka et al. |
| 8,184,337 | B2 | 5/2012 | Sakai |

(Continued)

FOREIGN PATENT DOCUMENTS

JP  2013-061925 A  4/2013

*Primary Examiner* — Christopher D Wait
(74) *Attorney, Agent, or Firm* — Fitzpatrick, Cella, Harper & Scinto

(57) ABSTRACT

Determination information is obtained to determine a degradation characteristic of sharpness of an image formed by an image forming apparatus. One of a plurality of recovery processing parameters used to recover sharpness of an image is selected based on the determination information, and characteristics of the plurality of recovery processing parameters are different from each other. Recovery processing of sharpness is performed on image data using the selected recovery processing parameter. When the degradation characteristics of sharpness are visually and substantially the same, the same recovery processing parameter is selected.

22 Claims, 21 Drawing Sheets

(56) References Cited

U.S. PATENT DOCUMENTS

| | | |
|---|---|---|
| 8,194,279 B2 | 6/2012 | Ishikawa et al. |
| 8,208,172 B2 | 6/2012 | Takayama et al. |
| 8,208,763 B2 | 6/2012 | Hara et al. |
| 8,223,368 B2 | 7/2012 | Hosaki et al. |
| 8,295,598 B2 | 10/2012 | Inoue et al. |
| 8,325,377 B2 | 12/2012 | Takasaka et al. |
| 8,406,295 B2 | 3/2013 | Ishikawa |
| 8,411,988 B2 | 4/2013 | Nakagawa et al. |
| 8,456,684 B2 | 6/2013 | Hosaki et al. |
| 8,520,012 B2 | 8/2013 | Hara et al. |
| 8,619,336 B2 | 12/2013 | Tsutsumi et al. |
| 8,718,359 B2 | 5/2014 | Sakai et al. |
| 8,749,659 B2 | 6/2014 | Watanabe |
| 9,118,848 B2 | 8/2015 | Ishikawa et al. |
| 9,189,681 B2 | 11/2015 | Kunieda et al. |
| 9,214,027 B2 | 12/2015 | Sumi et al. |
| 9,275,270 B2 | 3/2016 | Suwa et al. |
| 2004/0141209 A1* | 7/2004 | Marumoto ............ H04N 1/4078 358/3.26 |
| 2011/0285871 A1 | 11/2011 | Sakai |
| 2013/0050539 A1* | 2/2013 | Watanabe ................ G06T 5/003 348/241 |
| 2014/0013213 A1 | 1/2014 | Kajiwara et al. |
| 2014/0185932 A1 | 7/2014 | Sakai et al. |
| 2015/0248750 A1* | 9/2015 | Tsujita ................. A61B 8/0883 382/131 |

\* cited by examiner

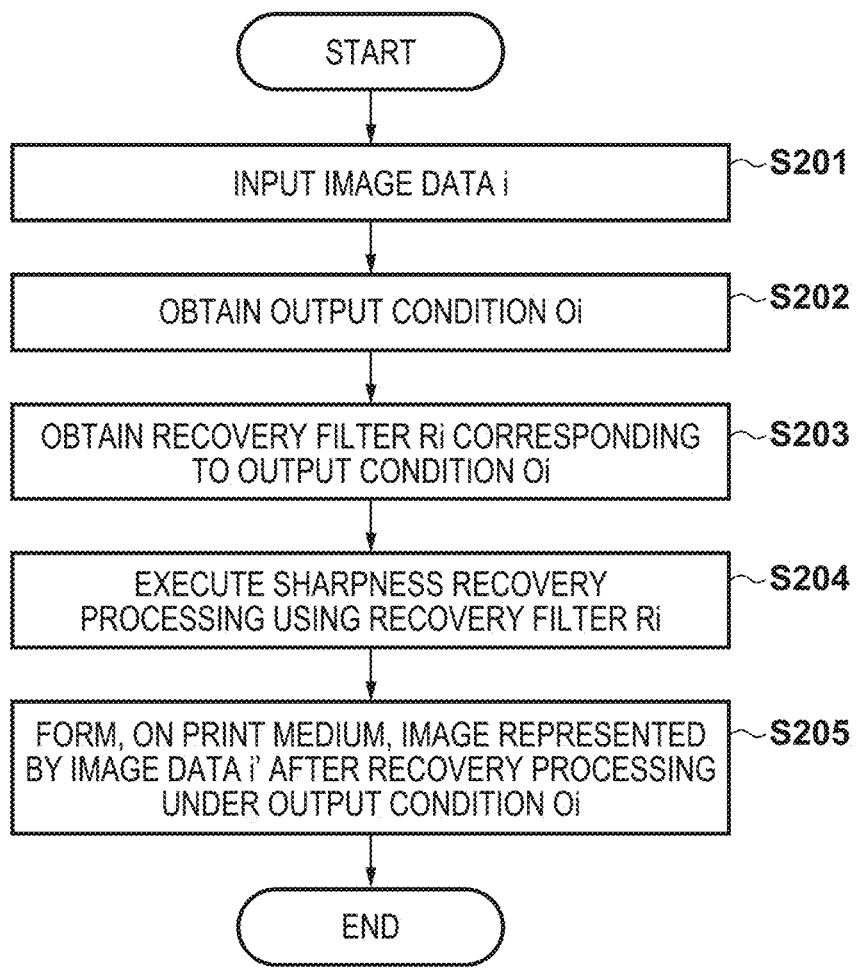

FIG. 3

| OUTPUT CONDITION | PRINT MEDIUM | PASS COUNT | CARRIAGE SPEED | PRINT DIRECTION | HT PATTERN | HEAD DISTANCE | USE OF CL INK | COLOR SETTING | FILTER NUMBER |
|---|---|---|---|---|---|---|---|---|---|
| O1 | A | 16 | LOW | ONE-WAY | HT1 | SHORT | ABSENCE | COLOR | 1 |
| O2 | A | 32 | LOW | ONE-WAY | HT1 | SHORT | ABSENCE | COLOR | 1 |
| O3 | A | 16 | HIGH | ONE-WAY | HT1 | SHORT | ABSENCE | COLOR | 1 |
| O4 | A | 16 | LOW | TWO-WAY | HT1 | SHORT | ABSENCE | COLOR | 1 |
| O5 | A | 16 | LOW | ONE-WAY | HT2 | SHORT | ABSENCE | COLOR | 1 |
| ... | ... | ... | ... | ... | ... | ... | ... | ... | ... |
| Oa | A | 32 | HIGH | TWO-WAY | HT2 | LONG | PRESENCE | MONOCHROME 1 | 2 |
| ... | ... | ... | ... | ... | ... | ... | ... | ... | ... |
| Ob | B | 16 | LOW | ONE-WAY | HT1 | SHORT | ABSENCE | INK SAVING | 1 |
| ... | ... | ... | ... | ... | ... | ... | ... | ... | ... |
| Oc | C | 16 | LOW | ONE-WAY | HT1 | SHORT | ABSENCE | INK SAVING | 3 |
| ... | ... | ... | ... | ... | ... | ... | ... | ... | ... |

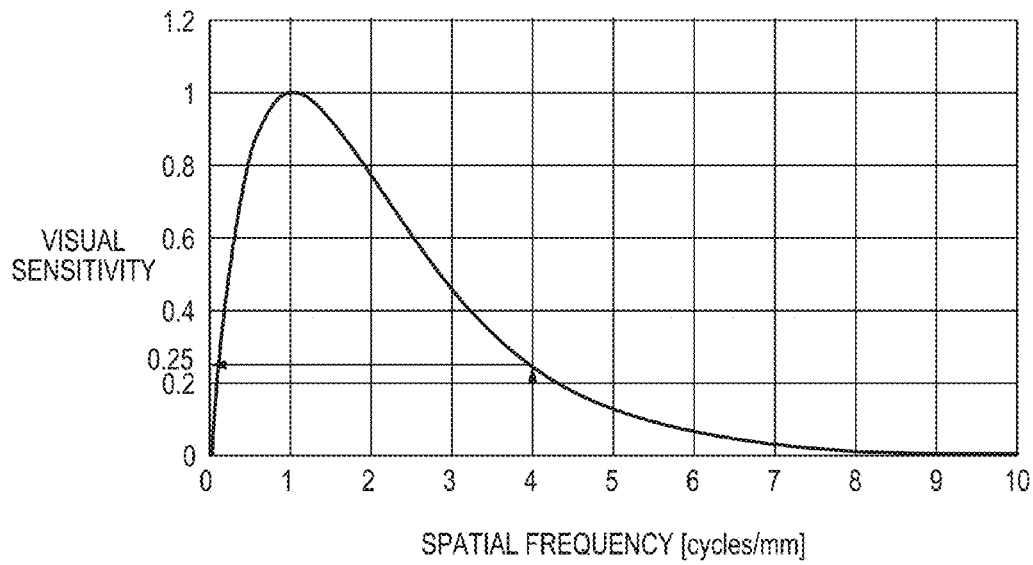

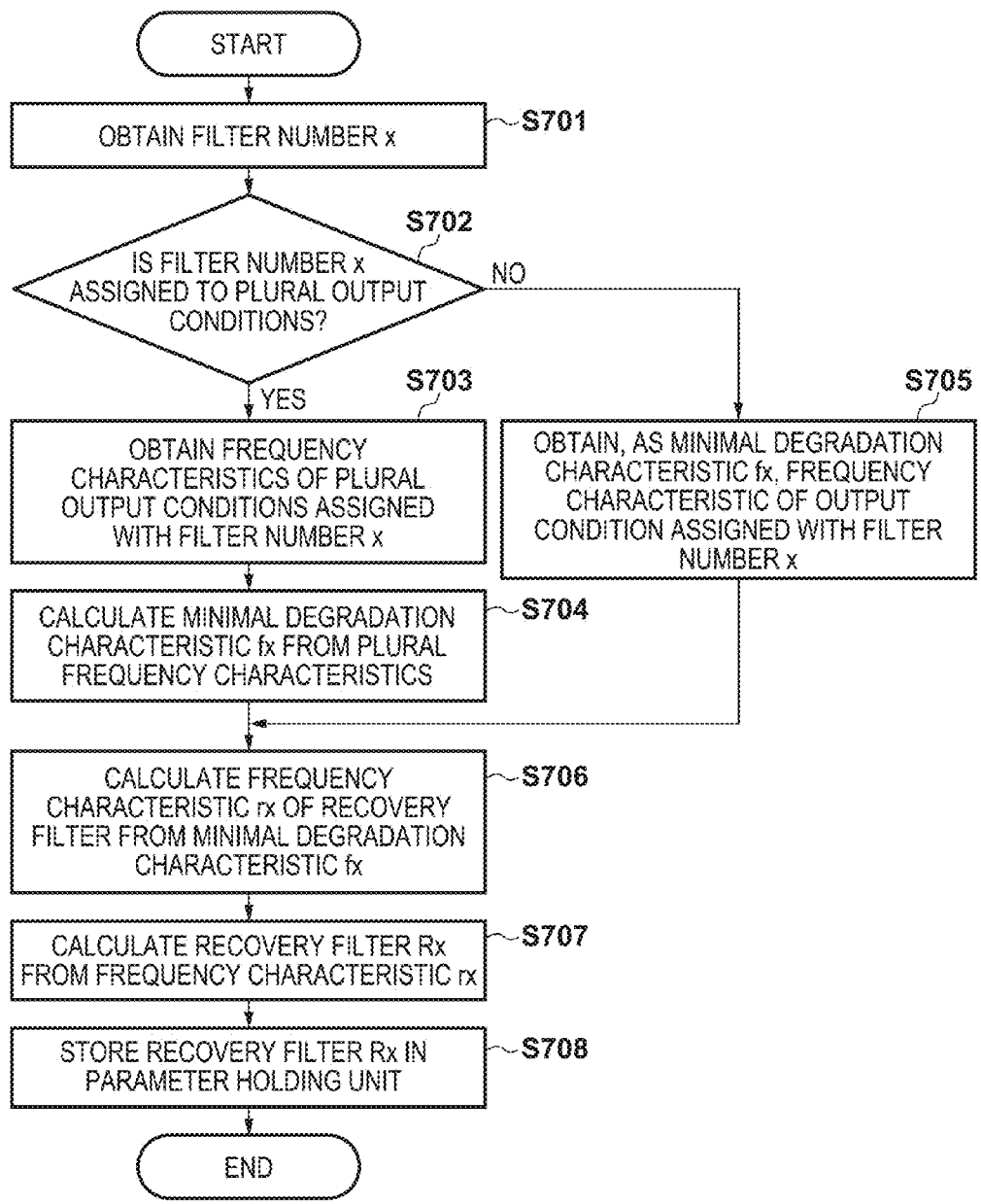

FIG. 10A

| OUTPUT MEDIUM | LUT NUMBER FILTER NUMBER |
|---|---|
| A | LUT1 |
| B | LUT1 |
| C | FILTER 3 |
| ⋮ | ⋮ |

FIG. 10B

| CLEAR INK | LUT NUMBER FILTER NUMBER |
|---|---|
| PRESENCE | LUT2 |
| ABSENCE | FILTER 1 |

FIG. 11

DESIGNATION OF OUTPUT CONDITION

| | |
|---|---|
| PAPER | MEDIUM A ▽ |
| CLEAR INK | ⦿ ON   ○ OFF |
| PRINT QUALITY | FINE ▽ |
| COLOR MODE | ⦿ COLOR  ○ MONOCHROME |
| HALFTONE | ⦿ ERROR DIFFUSION<br>○ DITHER |

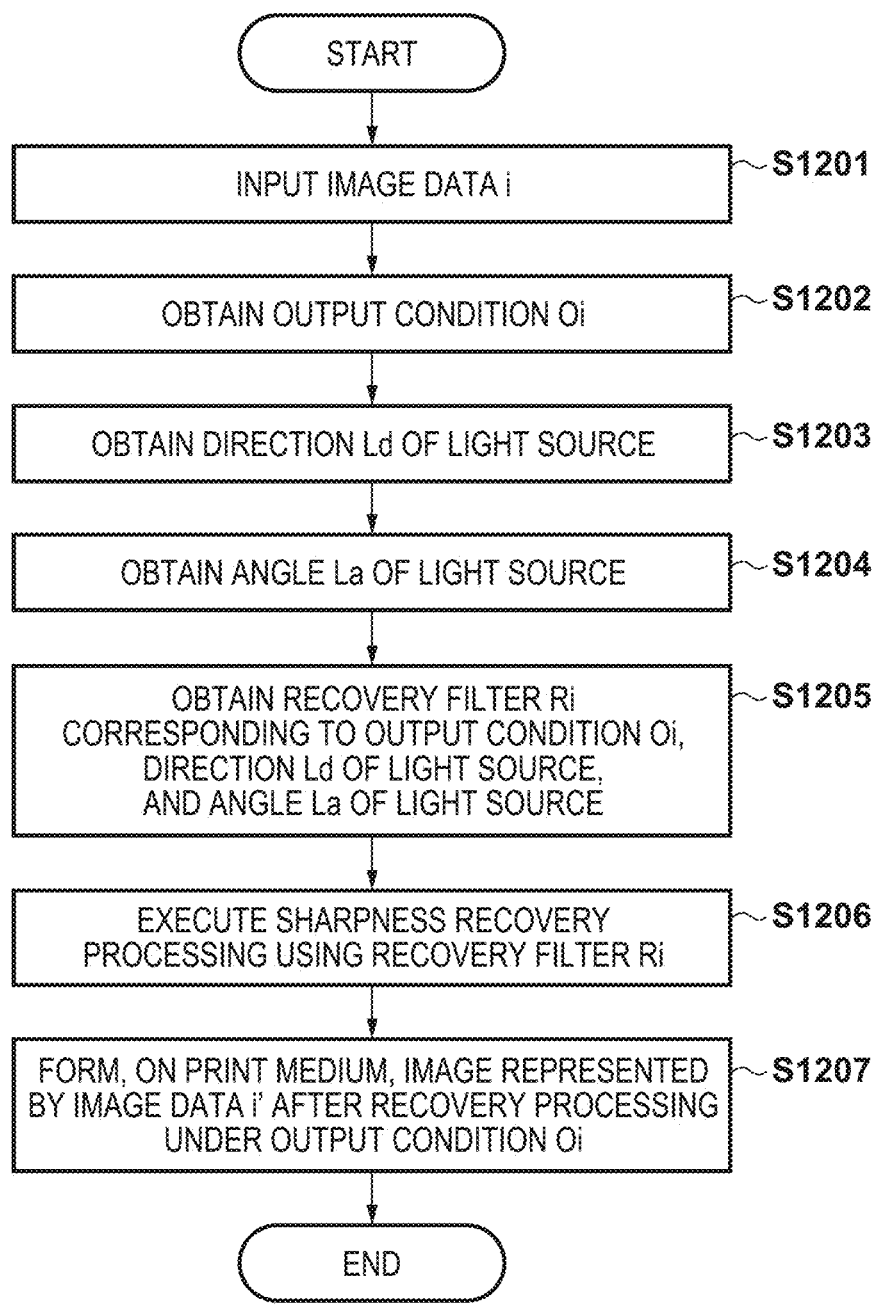

F I G. 14
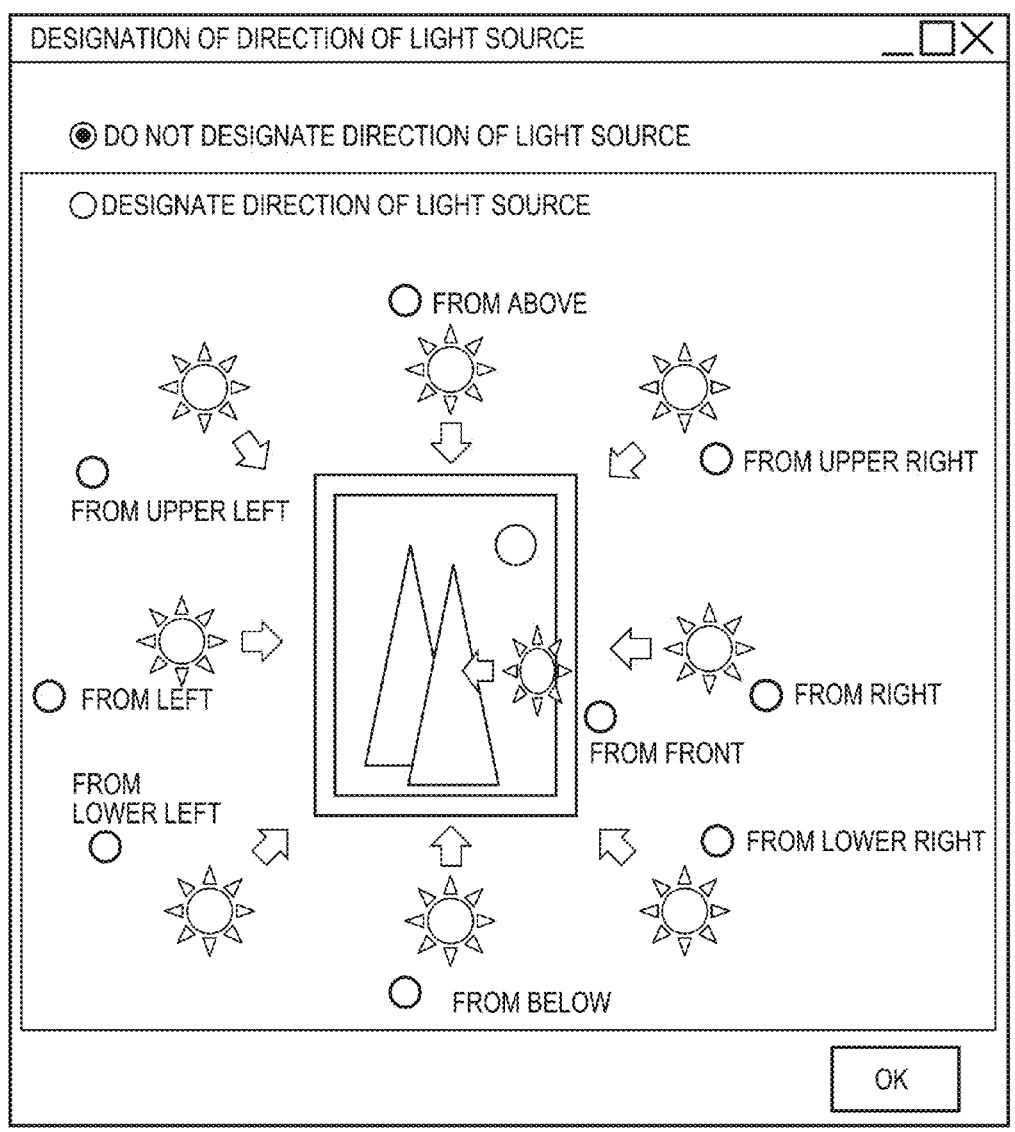

F I G. 16

| CONDITION | PRINT MEDIUM | PASS COUNT | CARRIAGE SPEED | PRINT DIRECTION | ... | DIRECTION OF LIGHT SOURCE | ANGLE OF LIGHT SOURCE | FILTER INFORMATION |
|---|---|---|---|---|---|---|---|---|
| C1 | A | 32 | LOW | ONE-WAY | ... | FROM ABOVE | 5° | 1(0°) |
| C2 | A | 32 | LOW | ONE-WAY | ... | FROM ABOVE | 25° | 1(0°) |
| ... | ... | ... | ... | ... | ... | ... | ... | ... |
| Ca | A | 32 | LOW | ONE-WAY | ... | FROM ABOVE | 85° | 2(0°) |
| ... | ... | ... | ... | ... | ... | ... | ... | ... |
| Cb | A | 32 | LOW | ONE-WAY | ... | FROM UPPER RIGHT | 5° | 1(45°) |
| Cc | A | 32 | LOW | ONE-WAY | ... | UNDESIGNATED | UNDESIGNATED | 0 |
| ... | ... | ... | ... | ... | ... | ... | ... | ... |

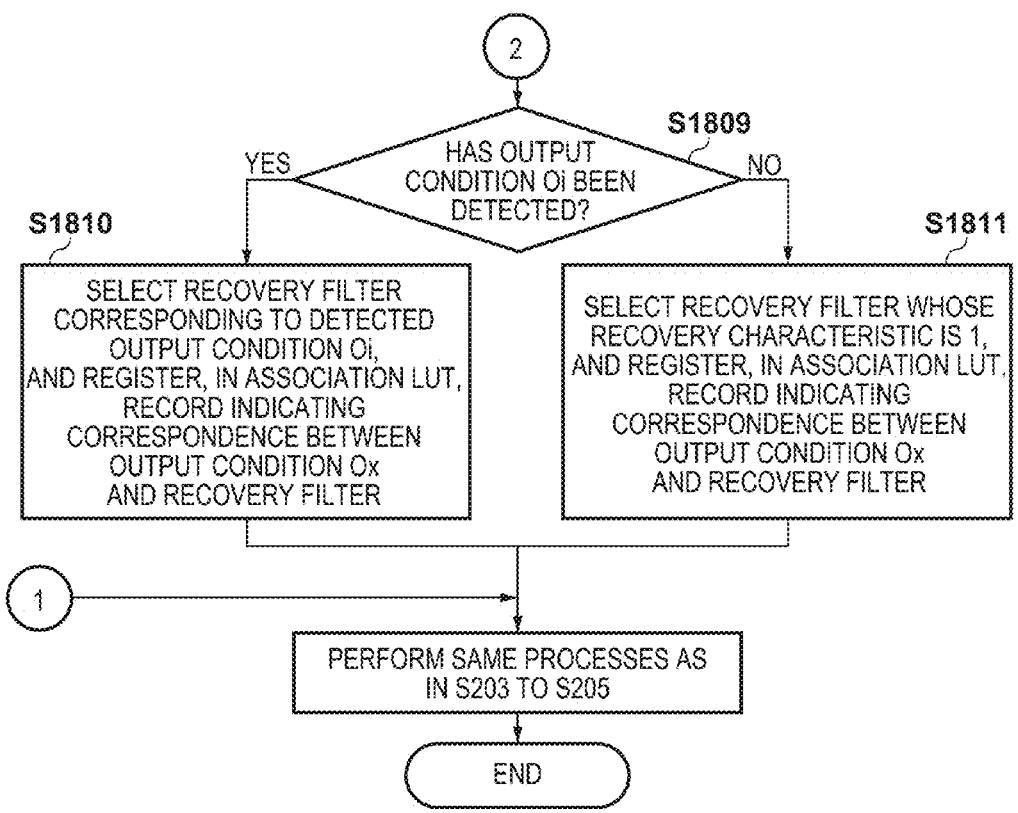
F I G. 20B

IMAGE PROCESSING APPARATUS WITH SHARPNESS DETERMINATION, INFORMATION PROCESSING APPARATUS, AND METHODS THEREFOR

BACKGROUND OF THE INVENTION

Field of the Invention

The present invention relates to recovery processing of the sharpness of an image formed by an image forming apparatus.

Description of the Related Art

It is known that the sharpness of an image output from an image forming apparatus degrades due to misalignment of the landing position of ink, the spread of ink, an optical blur (optical dot gain), or the like. If the frequency characteristic (to be referred to as a "sharpness degradation characteristic" hereinafter) of sharpness degradation of the output image can be obtained, sharpness degradation can be canceled by recovery filter processing having the opposite characteristic.

Note that the sharpness degradation characteristic is different depending on the type of image forming apparatus (inkjet method, electrophotographic method, or the like), a model, the type of print medium (print sheet), an output condition, a light source distribution (angle and direction) at the time of viewing of an image, and the like. In, for example, an image forming apparatus using the inkjet method, the sharpness degradation characteristic changes in accordance with differences in the spread of ink depending on an ink type (dye or pigment), an optical dot gain at the time of viewing, a print medium, and the like.

Japanese Patent Laid-Open No. 2013-61925 (literature 1) describes a technique of performing sharpness recovery processing using a different sharpness recovery filter in accordance with a print medium, ink type, an input device, and a portion of an object. In this technique, the sharpness degradation characteristic of an output image and a sharpness recovery filter have a one-to-one correspondence. As a result, since it is necessary to hold sharpness recovery filters for all combinations of the items of an output condition, such as a print medium, ink type, pass count, carriage speed, scanning direction (two-way or one-way printing), and halftone processing, the technique is not practical.

The technique in literature 1 cannot cope with unknown print media (unregistered print media) at all. Furthermore, although the appearance (degradation characteristic) of the sharpness of an output image is different depending on an illumination position at the time of viewing of the image, the technique in literature 1 does not consider this point.

SUMMARY OF THE INVENTION

In one aspect, an image processing apparatus comprising: an obtaining unit configured to obtain determination information to determine a degradation characteristic of sharpness of an image formed by an image forming apparatus; a first selection unit configured to select one of a plurality of recovery processing parameters used to recover sharpness of an image, based on the determination information, characteristics of the plurality of recovery processing parameters being different from each other; and a recovery unit configured to perform recovery processing of sharpness on image data using the selected recovery processing parameter, wherein in a case when the degradation characteristics of sharpness are visually and substantially the same in a low frequency range of the image, the same recovery processing parameter is selected.

In another aspect, an information processing apparatus comprising: an obtaining unit configured to obtain a spatial frequency characteristic of a pattern formed by an image forming apparatus based on an output condition; and a generation unit configured to generate a table indicating correspondence between the output condition and a recovery processing parameter for recovering sharpness of an image, wherein the generation unit assigns a common recovery processing parameter to a plurality of output conditions having substantially the same degradation characteristic of the sharpness in a low frequency range of the image.

According to these aspects, it becomes unnecessary to hold sharpness recovery processing parameters for all combinations of the items of an output condition.

Further features of the present invention will become apparent from the following description of exemplary embodiments with reference to the attached drawings.

BRIEF DESCRIPTION OF THE DRAWINGS

FIG. 2 is a flowchart for explaining an overview of processing in the image processing apparatus.

FIG. 3 is a table showing an example of an association LUT.

FIG. 7 is a graph showing a visual characteristic calculated by a known method.

FIG. 8 is a table showing an example of the association LUT before determination of whether frequency characteristics are almost the same.

FIG. 9 is a flowchart for explaining recovery filter creation processing.

FIGS. 10A and 10B are tables each showing an example of an association LUT according to the second embodiment.

FIG. 11 is a view showing an example of a UI preferable for the association LUTs having a hierarchical structure.

FIG. 13 is a flowchart for explaining an overview of processing in an image processing apparatus according to the third embodiment.

FIG. 14 is a view showing an example of a UI for designating a direction Ld of the light source.

FIG. 16 is a table showing an example of an association LUT according to the third embodiment.

FIGS. 20A and 20B are flowcharts for explaining processing in an image processing apparatus according to the fifth embodiment.

DESCRIPTION OF THE EMBODIMENTS

Image processing and information processing according to embodiments of the present invention will be described in detail below with reference to the accompanying drawings. Note that the embodiments are not intended to limit the present invention to the scope of the claims, and not all of the combinations of arrangements set forth in the embodiments are necessarily required with respect to the solution to solve the problems according to the present invention.

FIG. 7 shows a visual characteristic calculated by a known method (Dooley's approximation). Assume that a viewing distance is 300 mm. As shown in FIG. 7, as a spatial frequency rises, a human visual sensitivity characteristic (to be referred to as a "visual characteristic) lowers. For example, the visual characteristic is equal to or smaller than 0.25 in a spatial frequency range (to be referred to as a "frequency range" hereinafter) exceeding, for example, 4 cycles/mm, and even if sharpness degradation occurs, it is difficult to perceive it. A spatial frequency (for example, 4 cycles/mm) at which it becomes difficult to perceive sharpness degradation will be referred to as a "visual limit frequency" hereinafter. A spatial frequency may simply be referred to as a "frequency" hereinafter.

First Embodiment

The first embodiment will describe an example in which a table for associating an output condition with a recovery filter corresponding to the output condition is included, and when sharpness degradation characteristics in the frequency range below the visual limit frequency can be considered to be almost the same, sharpness recovery processing is performed using a common recovery filter.

[Arrangement of Apparatus and Overview of Processing]

Figure 1:
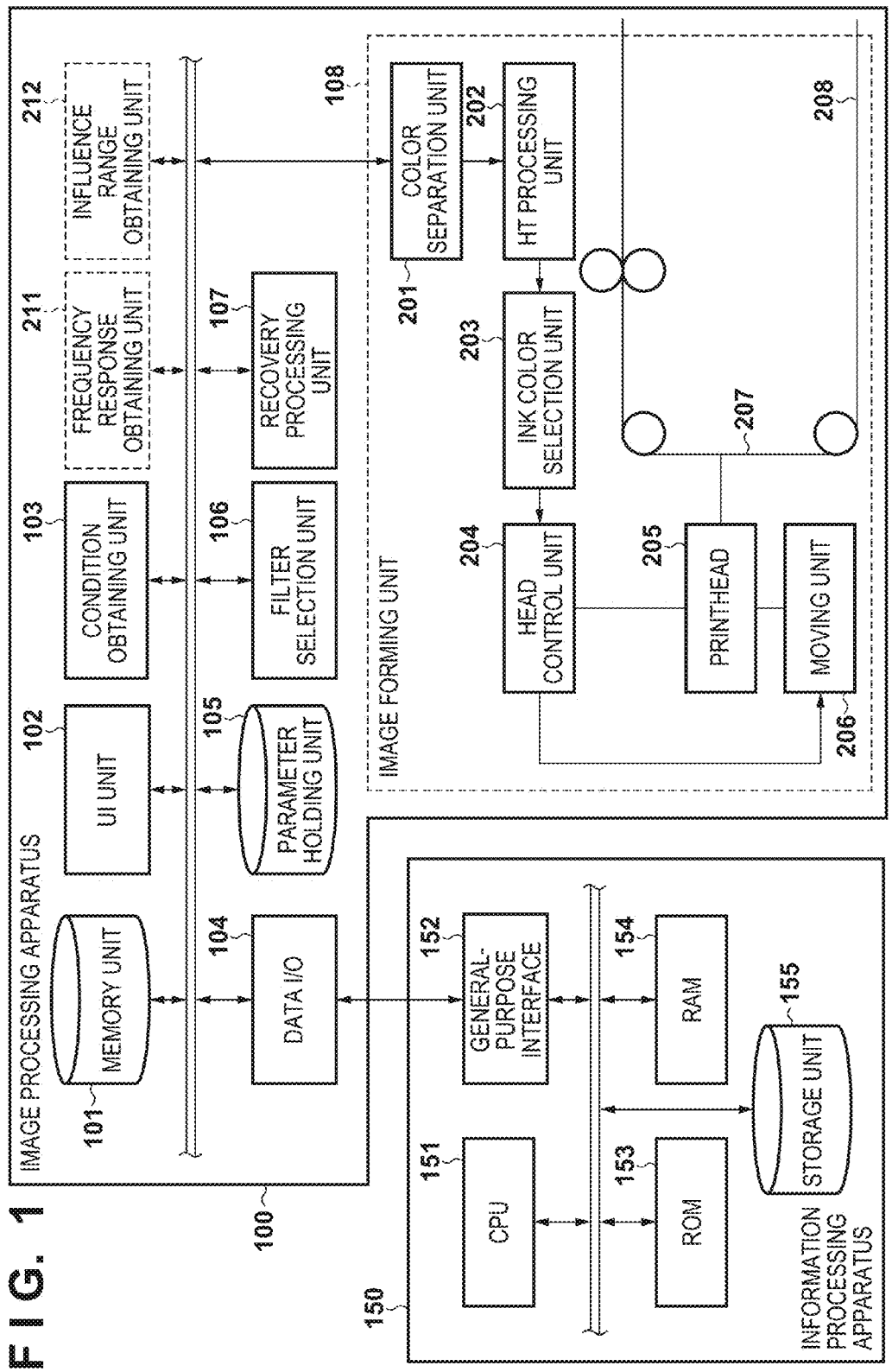
FIG. 1 is a block diagram showing the arrangement of an image processing apparatus according to an embodiment.

FIG. 1 is a block diagram showing the arrangement of an image processing apparatus 100 according to the embodiment. FIG. 2 is a flowchart for explaining an overview of processing in the image processing apparatus 100. A recovery processing unit 107 inputs image data i as an image forming target from an information processing apparatus 150 or the like through a data input/output unit (data I/O) 104, and stores the input image data i in a memory unit 101 such as a random access memory (RAM) (S201).

A condition obtaining unit 103 obtains an output condition Oi of an image forming unit 108 through a user interface (UI) unit 102 or from the information processing apparatus 150 (S202). The items of the output condition Oi include a pass count, a carriage speed, a print direction (two-way or one-way), a halftone pattern, the distance between a printhead and a print medium, the presence/absence of the use of clear ink, a color setting, the presence/absence of a silent setting, and the type of print medium. Note that clear ink (to be referred to as "CL ink" hereinafter) indicates ink containing a colorless transparent or substantially colorless transparent pigment.

A filter selection unit 106 accesses a parameter holding unit 105 to obtain a recovery filter Ri corresponding to the output condition Oi (S203). The recovery processing unit 107 executes sharpness recovery processing for the input image data i using the recovery filter Ri, and stores image data i' after the recovery processing in the memory unit 101 (S204). Under the output condition Oi, the image forming unit 108 forms, on a print medium 208, an image represented by the image data i' after the recovery processing (S205).

Image Forming Unit

A color separation unit 201 of the image forming unit 108 performs color separation for the image data i' in an RGB format into material amount data corresponding to the ink colors (and CL ink, as needed) of the image forming unit 108 with reference to a color separation table. A halftone (HT) processing unit 202 outputs, as print data (to be referred to as "HT data" hereinafter) after HT processing, quantization data obtained by quantizing, using a halftone pattern (to be referred to as an "HT pattern" hereinafter), the material amount data output from the color separation unit 201.

The image forming unit 108 serves as a printing apparatus using a thermal transfer method, an inkjet method, or the like, and forms, on the print medium 208, an image represented by the HT data input for each band by relatively moving a printhead 205 in the vertical and horizontal directions with respect to the print medium 208. At this time, an ink color selection unit 203 selects ink colors corresponding to the input HT data from the ink colors of the printhead 205.

The printhead 205 includes one or more printing elements (nozzles in the case of the inkjet method). The relative movement in the vertical and horizontal directions of the printhead 205 is implemented when a head control unit 204 controls a moving unit 206 to move the printhead 205 in the X direction (main scanning direction), and controls a conveyance unit 207 to convey the print medium 208 in the Y direction (sub-scanning direction).

Parameter Holding Unit

The parameter holding unit 105 is, for example, a non-volatile memory such as an electrically erasable and programmable read only memory (EEPROM) or flash memory, and holds a lookup table (to be referred to as an "association LUT" hereinafter) for associating the above-described output condition with a recovery filter. FIG. 3 shows an example of the association LUT, and FIG. 4 shows examples of a spatial frequency characteristic when an image is output under a given output condition.

Figure 4:
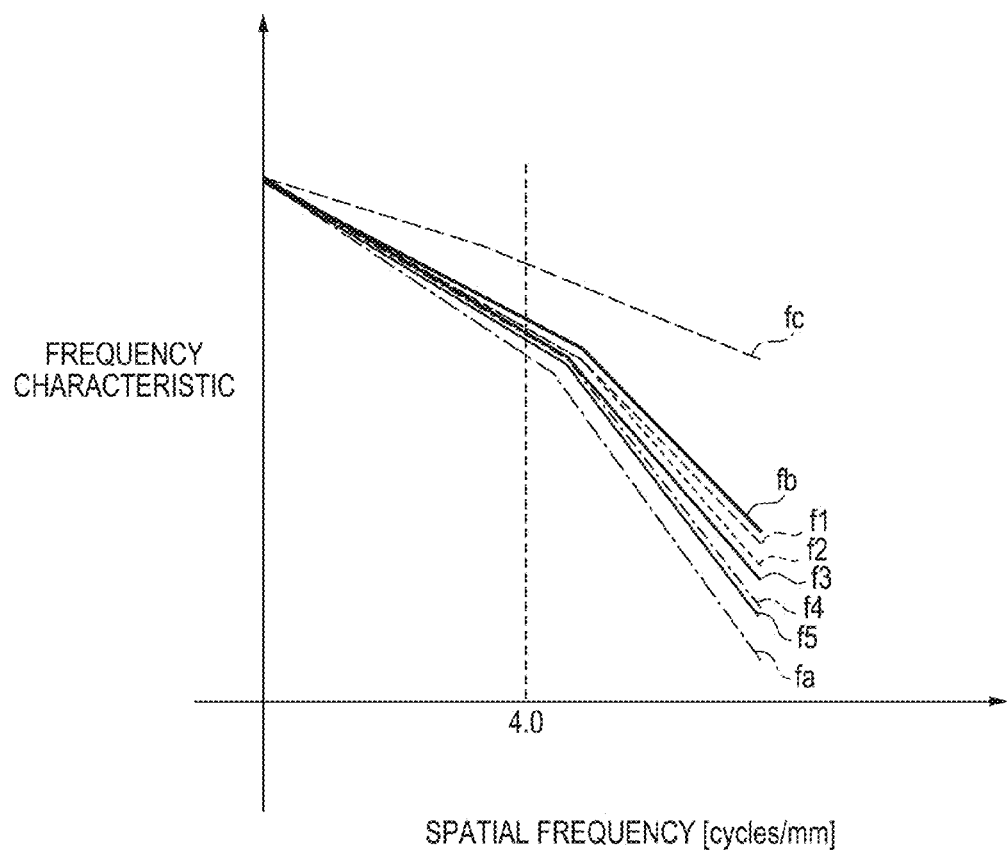
FIG. 4 is a graph showing examples of a spatial frequency characteristic when an image is output under a given output condition.

Referring to FIG. 4, frequency characteristics f1 to f5, fa, fb, and fc correspond to output conditions O1 to O5, Oa, Ob, and Oc shown in FIG. 3, respectively. For example, it is possible to use the same recovery filter for output conditions, for example, the output conditions O1 to O5 and Ob, under which frequency characteristics f in a low frequency range (to be referred to as an "important range" hereinafter) that is important in terms of the visual characteristic (the sensitivity is high) can be considered to be almost the same. Note that a method of calculating a frequency characteristic corresponding to each output condition will be described in detail later.

Information Processing Apparatus

The image processing apparatus 100 is connected to the information processing apparatus 150 as a computer apparatus such as a personal computer. A serial bus such as USB (Universal Serial Bus), a wired or wireless network, or the like can be used to connect the image processing apparatus 100 and the information processing apparatus 150.

A microprocessor (CPU) 151 of the information processing apparatus 150 controls the operation of the information processing apparatus 150 by executing an operating system (OS) and various programs stored in a ROM 153 and a storage unit 155 using a RAM 154 as a work memory. A storage unit 155 such as a hard disk drive (HDD) or solid-state drive (SSD) stores a printer driver, a creation program for implementing a function of creating an association LUT and a recovery filter, and the like. The CPU 151 which executes the printer driver, supplies image data to the image processing apparatus 100 through a general-purpose interface 152 such as USB and the wired or wireless network. The CPU 151 which executes the creation program creates, through the general-purpose interface 152 and the wired or wireless network, an association LUT and a recovery filter to be held in the parameter holding unit 105.

If, for example, the image processing apparatus 100 serves as a multi-functional peripheral (MFP) including a scanner, it is possible to create an association LUT and a recovery filter by causing the CPU (not shown) of the image processing apparatus 100 to execute the creation program for creating an association LUT and a recovery filter.

[Factor for Sharpness Degradation]

The sharpness of an image output from the image forming unit 108 changes due to the influences of misalignment of the landing position of ink, the spread of ink, an optical dot gain, and the frequency characteristic of an HT pattern. Misalignment of the landing position of ink, the spread of ink, an optical dot gain, and the frequency characteristic of an HT pattern change in accordance with the output condition of the image forming unit 108. Consequently, the sharpness of the output image is different depending on the output condition of the image forming unit 108. That is, if the output conditions O1 to O5, Oa, Ob, and Oc shown in FIG. 3 are used, the frequency characteristics are the different frequency characteristics f1 to f5, fa, fb, and fc shown in FIG. 4.

If, for example, the pass counts are different like the output conditions O1 and O2, the ink amounts discharged by one pass are different. If the pass count is small, a dot adhering ratio becomes relatively high and the fixing time becomes relatively long, resulting in an increase in spread amount of ink. Furthermore, if the pass count is small, the misalignment of each discharge nozzle causes density unevenness in a stripe shape but this becomes a phase shift because of the frequency characteristic and thus a blur is little (sharpness degradation is small). To the contrary, if the pass count is increased, the influence of the misalignment of each discharge nozzle is relaxed to reduce the density unevenness in a stripe shape but the sharpness degrades (a blur increases). As described above, by only changing the pass count, the frequency characteristic of the output image changes, as indicated by, for example, f1 and f2.

If the carriage speed is changed as indicated by the output conditions O1 and O3, the relative positions of a main droplet (a droplet forming a density) and a droplet (to be referred to as a "satellite" hereinafter) other than the main droplet become misaligned. Since the discharge speeds of the main droplet and satellite are different, as the carriage speed increases, the relative misalignment (to be referred to as misalignment between the main and satellite) becomes large. Furthermore, the spread of ink also changes. For example, if the carriage moves fast, the interval between passes is small. Therefore, the next ink readily lands before the ink is dried, and thus the ink readily spreads. As described above, if the carriage speed is changed, the spread and the misalignment between the main and satellite change. As a result, the frequency characteristic of the output image changes, as indicated by, for example, f1 and f3.

Similarly, if the output conditions, for example, the output conditions O1 and O4, are different in terms of one-way printing in which printing is executed in the forward direction of the printhead 205 and two-way printing in which printing is executed in the forward and backward directions of the printhead 205, the alignment amount of registration and the interval between passes are different. As a result, the frequency characteristic of the output image changes, as indicated by, for example, f1 and f4.

Furthermore, like the output conditions O1 and O5, in an HT pattern in which there are many adjacent dots within a pass, the dots are readily connected to each other, and thus the spread readily increases. Furthermore, since the HT pattern has a frequency characteristic and the image output from the image forming unit 108 is quantized by the HT pattern, the frequency characteristic of the output image changes in accordance with the frequency characteristic of the HT pattern, as indicated by, for example, f1 and f5.

In addition, if the distance (to be referred to as a "head distance" hereinafter) between the printhead 205 and the print medium 208 is short, misalignment of a landing position becomes small. If pigment ink is used, overcoating may be performed using CL ink to reduce gloss unevenness and a stain. In this case, the refractive index of the surface of the output image changes, resulting in a change in optical dot gain. If a color setting such as an ink saving mode, monochrome mode, and saturation is changed, the discharge amount of each ink changes. Consequently, the spread is different depending on the ink saving mode and color setting. Like the output conditions O1 and Oa, the frequency characteristic of the output image changes in accordance with the head distance, the presence/absence of the use of CL ink, and the color setting, as indicated by, for example, f1 and fa.

The degradation characteristic of the sharpness of the output image changes in accordance with the spread of ink depending on the print medium 208 and the optical dot gain. Especially, the frequency characteristic changes in accordance with the thickness of the receptive layer of the print medium 208 and the particle size (to be referred to as the "particle size of a receptor material" hereinafter) of a material for forming the receptive layer. If the particle size of the receptor material is large, light entering the print medium 208 is difficult to diffuse, resulting in a small blur caused by the optical dot gain. The receptive layer and support layer of the print medium 208 have different diffusion coefficients of light due to different materials and structures. As a result, the optical dot gain is different depending on the thickness of the receptive layer. The thickness of the receptive layer and the particle size of the receptor material are associated with the penetration speed and absorption limit of ink. Therefore, if the type of the print medium 208 is different like the output conditions O1, Ob, and Oc, the frequency characteristic of the output image changes, as indicated by, for example, f1, fb, and fc.

As described above, the frequency characteristic of the output image of the image forming unit 108 changes in accordance with the output condition Oi. Therefore, to perform best recovery processing in a frequency region (important range) perceivable by human eyes, the parameter holding unit 105 needs to hold the parameters of recovery filters corresponding to all combinations of the items of the above-described output condition Oi. For example, the number Nc of combinations is as follows.

Nc="the number of pass counts"×"the number of carriage speeds"×"ON/OFF of two-way printing"×"the number of HT patterns"×"the number of head distances"×"ON/OFF of the use of CL ink"×"ON/OFF of the silent mode"×"ON/OFF of the ink saving mode"×"ON/OFF of the monochrome mode"×"the number of types of print media"

Referring to FIG. 3, Nc is 2 (pass count)×2 (carriage speed)×2 (two-way printing)×2 (HT pattern)×2 (head distance)×2 (use of CL ink)×2 (silent mode)×2 (ink saving mode)×2 (monochrome mode)×3 (type of print medium) =384. In other words, the parameter holding unit 105 needs to hold, as recovery processing parameters, recovery filters, the number of which is equal to that (for example, 384) of combinations, and requires a large memory capacity.

In the first embodiment, the frequency characteristic f is obtained for each output condition, and an association LUT for assigning the same filter number to output conditions under which the sharpness degradation characteristics in the important range are almost the same is created, thereby suppressing the memory capacity of the parameter holding unit 105.

For example, assume that it can be determined that the sharpness degradation characteristics in the important range of the frequency characteristics f1 to f5 and fb among the frequency characteristics f1 to f5, fa, fb, and fc shown in FIG. 4 are almost the same. In this case, the same filter number ("1" in the example of FIG. 3) is assigned to the output conditions O1 to O5 and Ob corresponding to f1 to f5 and fb in the association LUT. If it is required to reduce the memory capacity, the same filter number is also assigned to, for example, the output condition Oa corresponding to fa. To the contrary, if the memory capacity is sufficient, a different filter number (for example, "4") may be assigned to the output condition Ob under which the frequency characteristic in the important range is different most from those of the output conditions O1 to O5 in order to improve the accuracy of the recovery processing.

[Creation of Association LUT]

Figure 5:
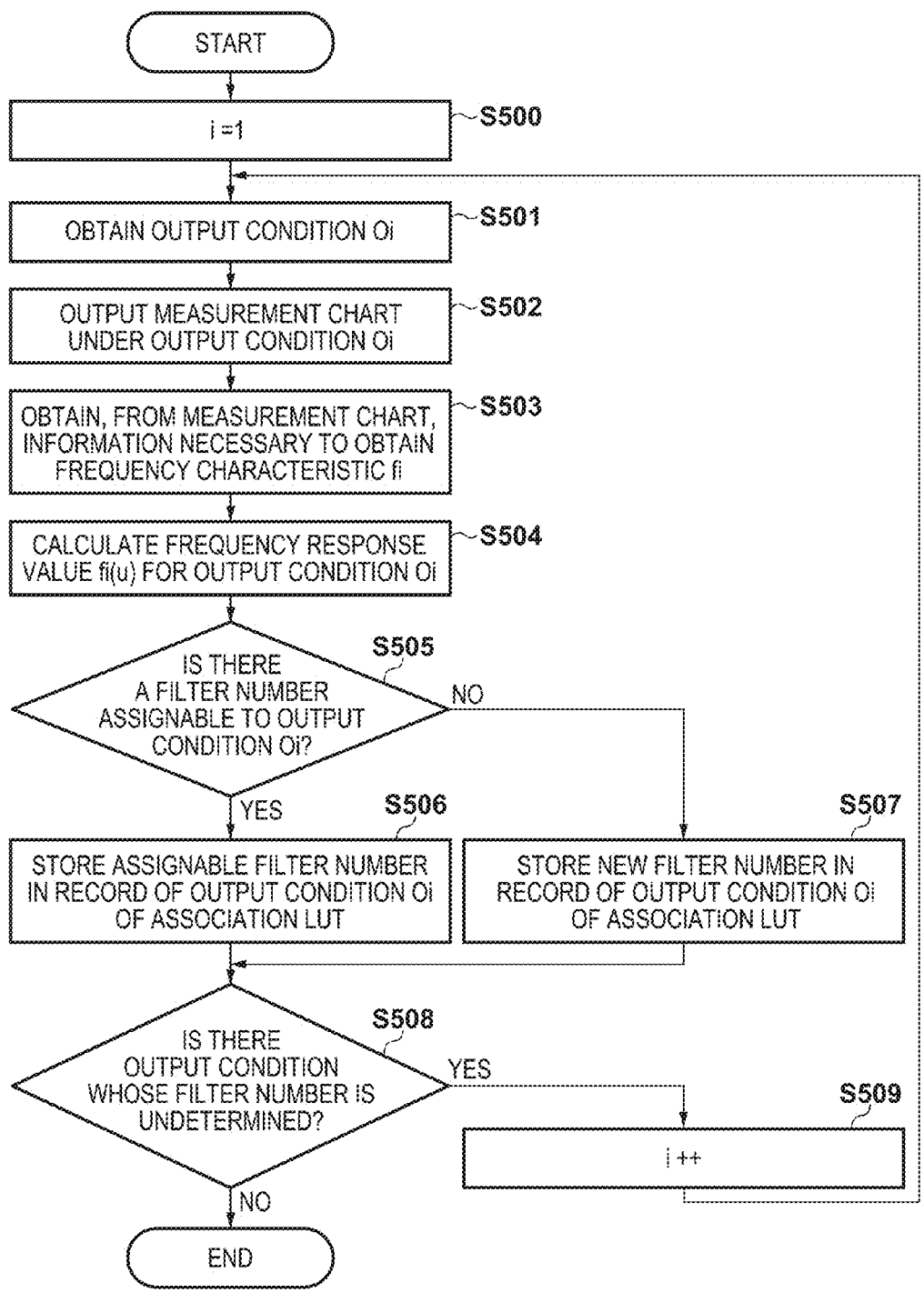
FIG. 5 is a flowchart for explaining association LUT creation processing.

FIG. 5 is a flowchart for explaining association LUT creation processing. The processing shown in FIG. 5 creates an association LUT for assigning the same filter number to output conditions under which the frequency characteristics in the important range (especially, the frequency range below the visual limit frequency) can be considered to be almost the same. Note that the processing shown in FIG. 5 is implemented by executing the association LUT creation program in the information processing apparatus 150. A recovery filter creation method will be described in detail later.

The CPU 151 initializes a counter i to "1" (S500), and obtains the output condition Oi by referring to the association LUT stored in the parameter holding unit 105 (S501). For example, the CPU 151 obtains a print medium "A", pass count "32", carriage speed "low", print direction "one-way", HT pattern "HT1 (error diffusion)", head distance "short", clear ink "absence", color setting "color" which are indicated as the output condition O1 in FIG. 3.

Figure 6:
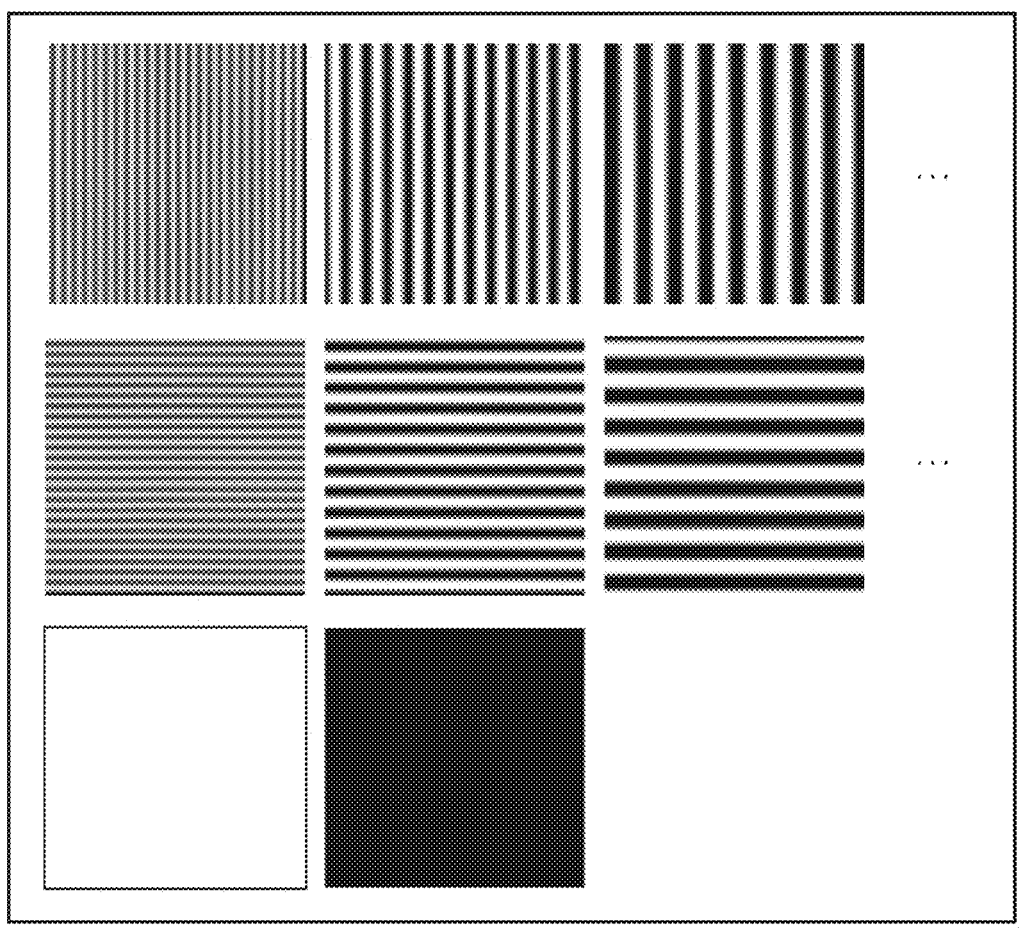
FIG. 6 is a view showing an example of a measurement chart.

The CPU 151 controls the image forming unit 108 to output a sharpness measurement chart under the output condition Oi (S502). Note that no recovery processing is performed at the time of output of the measurement chart, as a matter of course. FIG. 6 shows an example of the measurement chart. The measurement chart is an image chart including a plurality of sinusoidal wave patterns with different frequencies and lower left uniform patterns (for example, white and black solid patterns).

Next, using a measurement apparatus (not shown) connected to the general-purpose interface 152, the CPU 151 obtains, from the measurement chart, information necessary to obtain the frequency characteristic (S503). Based on the obtained information, the CPU 151 calculates a frequency response value fi(u) for the output condition Oi (S504). As the frequency response value fi(u), it is possible to use an absolute value MTF(u) of an optical transfer function calculated by:

$$fi(u) = MTF(u) = C(u)/C' \qquad (1)$$

where u represents the frequency of a sinusoidal wave, $$Cu(u) = \{Max(u) - Min(u)\}/\{Max(u) + Min(u)\},$$

$$C' = (White - Black)/(White + Black),$$

Max(u) represents the maximum refractive index of the sinusoidal wave pattern which changes at the frequency u, Min(u) represents the minimum refractive index of the sinusoidal wave pattern which changes at the frequency u, and White and Black respectively represent the refractive indices of the uniform patterns.

Calculation of MTF(u) is not limited to equation (1), as a matter of course. For example, the following equation may be used.

$$fi(u) = MTF(u) = \{Max(u) - Min(u)\}/(White - Black) \qquad (1')$$

According to equation (1), if the average brightness of the output image changes in accordance with the frequency of the sinusoidal wave, a response value becomes excessive in a dark portion with respect to a bright portion. Therefore, if the average brightness of the output image changes, the use of equation (1') is preferable to equation (1). Note that Max(u), Min(u), White, and Black have been described as refractive indices. However, for example, luminances, densities, or device RGB values may be used. As the measurement apparatus for obtaining information, such as Max(u), Min(u), White, and Black, necessary to obtain the frequency characteristic, for example, a scanner, digital camera, microscope, microdensitometer, or the like can be used.

As the measurement chart, the frequency characteristic fi(u) may be obtained using a rectangular wave pattern instead of the sinusoidal wave pattern. In this case, the value of a contrast transfer function (CTF) calculated by applying equation (1) to the rectangular wave pattern may be used for the frequency characteristic fi(u). The MTF value obtained by converting the CTF value using a known Coltman's correction formula may be used for the frequency characteristic fi(u). The subjective evaluation value of sharpness for the spatial frequency pattern may be used as the frequency characteristic fi(u).

Based on the frequency characteristic fi obtained by connecting the calculated frequency response values fi(u), the CPU 151 determines whether there is a filter number assignable to the output condition Oi (S505). If it is determined that there is a filter number assignable to the output condition Oi, the process advances to step S506; otherwise, the process advances to step S507.

A filter number assignable to the output condition Oi is that corresponding to a frequency characteristic which can be considered to be almost the same as the frequency characteristic fi among the obtained frequency characteristics f1 to fi−1. That is, it is determined whether each of the obtained frequency characteristics f1 to fi−1 can be considered to be almost the same as the frequency characteristic fi. It is determined whether the filter numbers already stored in the association LUT include a filter number corresponding to a frequency characteristic considered to be almost the same as the frequency characteristic fi, or a filter number assignable to the output condition Oi.

Assuming that fo represents the obtained frequency characteristic, the maximum value (or average value) of the differences between the response values in the important range in the frequency characteristics fi and fo is used to determine whether the frequency characteristics are almost the same. That is, if the maximum value (or average value) of the differences is smaller than a predetermined value, the frequency characteristics fi and fo are determined to be almost the same. Alternatively, if the difference between the response values at a specific frequency in the important range is smaller than the predetermined value, the frequency characteristics fi and fo may be determined to be almost the same. As the predetermined value, a measurement error, an integral multiple of the measurement error, or a constant value such as 0.05 can be used.

The difference is preferably a difference in power of the frequency characteristic in a frequency range in which the visual sensitivity is high and noise or a decrease in brightness in an output of a printer is small. For example, it is preferable to determine a difference in the important range (the low frequency range below the visual limit frequency).

It is preferable to calculate frequency characteristics for spatial frequency patterns, shown in FIG. 6, having different stripe directions at the same frequency, and consider the frequency characteristics to be almost the same regardless of the stripe directions when the difference in the important range is equal to or smaller than the predetermined value. Note that whether the frequency characteristics are almost the same may be determined by weighing the difference at each frequency in consideration of the visual frequency characteristic.

FIG. 8 shows an example of the association LUT before determination of whether the frequency characteristics are almost the same in step S505. The association LUT shown in FIG. 8 is different from that shown in FIG. 3 with respect to the image forming unit 108, and assignment of filter numbers is different. Creation of the association LUT shown in FIG. 8 is at a stage of i=6. In step S505, a filter number to be assigned to the output condition O6 is determined. That is, it is determined whether each of the obtained frequency characteristics f1 to f5 is almost the same as the frequency characteristic f6 of the output condition O6. The example of FIG. 8 shows a case in which it is determined that the frequency characteristics f1, f3, and f4 are considered to be almost the same as the frequency characteristic f6.

In this case, the frequency characteristics f3 and f4 of the output conditions O3 and O4 assigned with filter number 2 are almost the same as the frequency characteristic f6 of the output condition O6. Therefore, filter number 2 is assignable to the output condition O6. On the other hand, since filter number 1 assigned to the output condition O1 is also assigned to the output condition O2 whose frequency characteristic cannot be considered to be almost the same as the frequency characteristic f6, it is not determined that filter number 1 is assignable to the output condition O6. Since filter number 3 is assigned to the output condition O5 whose frequency characteristic cannot be considered to be almost the same as the frequency characteristic f6, it is not determined that filter number 3 is assignable to the output condition O6.

If there is a filter number assignable to the output condition Oi, the CPU 151 stores the assignable filter number in the record of the output condition Oi of the association LUT (S506). Note that if two or more filter numbers are assignable, for example, a smaller filter number or a filter number corresponding to a frequency characteristic whose difference is smaller is assigned.

On the other hand, if there is no filter number assignable to the output condition Oi, the CPU 151 stores a new filter number in the record of the output condition Oi of the association LUT (S507). For example, a filter number obtained by adding "1" to a largest one of the filter numbers stored in the association LUT is used as a new filter number.

The CPU 151 determines whether there is an output condition whose filter number is undetermined (unregistered) (S508). If there is an output condition whose filter number is undetermined, the CPU 151 increments the counter i (S509), and returns the process to step S501. This assigns the filter number to the next output condition. If there is no output condition whose filter number is undetermined (unregistered), the CPU 151 ends creation of the association LUT.

Note that if assignment of a frequency characteristic and filter number is processed according to the flowchart shown in FIG. 5, the number of recovery filters may not become minimum. For example, if there are output conditions Oe, Of, Og, and Oh, and it can be considered that the frequency characteristics of the output conditions Oe and Of are almost the same, the frequency characteristics of the output conditions Of and Og are almost the same, and the frequency characteristics of the output conditions Og and Oh are almost the same, the number of filters may be different depending on a processing order. In the first case, filter number E is assigned to the output conditions Oe and Of and filter number G is assigned to the output conditions Og and Oh, resulting in two recovery filters. In the second case, filter number E is assigned to the output condition Oe, filter number F is assigned to the output conditions Of and Og, and filter number H is assigned to the output condition Oh, resulting in three recovery filters. To minimize the number of filters, after a frequency characteristic is obtained for each output condition, the output conditions whose frequency characteristics can be considered to be almost the same are grouped based on the obtained frequency characteristics so that the number of filters becomes minimum, and a filter number is assigned for each group.

An example has been described in which the CPU 151 accesses the association LUT in the parameter holding unit 105 to perform filter number registration processing. However, the CPU 151 can obtain an association LUT, in which filter numbers are unregistered, from the parameter holding unit 105, the storage unit 155, or a server apparatus (not shown), perform filter number registration processing, and store the association LUT after the registration processing in the parameter holding unit 105.

[Generation of Recovery Filter]

The purpose of recovery processing is to recover the sharpness. If the frequency characteristic after recovery exceeds 1, the recovery processing turns to enhancement processing. Furthermore, excessive recovery processing causes an adverse effect such as enhancement of noise, a decrease in brightness, and occurrence of ringing; however, lack of recovery hardly causes an adverse effect. For these reasons, if recovery processing is performed using a common recovery filter for a plurality of output conditions, it is preferable to generate a common recovery filter so as not to perform excessive recovery processing.

Therefore, when generating a different recovery filter for each filter number registered in the association LUT, a frequency characteristic (to be referred to as a "minimal degradation characteristic" hereinafter) in which sharpness degradation characteristic is minimal is obtained from the frequency characteristics of a plurality of output conditions for which a recovery filter is used, in order to prevent excessive recovery processing. The recovery filter is generated based on the minimal degradation characteristic.

FIG. 9 is a flowchart for explaining recovery filter generation processing. The processing shown in FIG. 9 is implemented by executing the recovery filter generation program in the information processing apparatus 150. FIG. 9 shows processing of generating a recovery filter corresponding to one filter number. However, the recovery filter generation processing is repeated by the number of filter numbers registered in the association LUT, as a matter of course.

The CPU 151 obtains a filter number x by accessing the association LUT in the parameter holding unit 105 (S701), and determines whether the filter number x is assigned to a plurality of output conditions (S702). If the filter number x is assigned to a plurality of output conditions, the CPU 151 obtains frequency characteristics fx1, fx2, ... of output conditions Ox1, Ox2, ... assigned with the filter number x (S703). A frequency characteristic fx (to be referred to as a "minimal degradation characteristic fx" hereinafter) in which sharpness degradation characteristic is minimal is calculated (S704) by:

$$fx(u)=\max\{fx1(u), fx2(u), \ldots\} \qquad (2)$$

where u represents a spatial frequency, and
max( ) represents a function of outputting the maximum value.

If the filter number x is assigned to one output condition, the CPU 151 obtains the frequency characteristic of the output condition as the minimal degradation characteristic fx (S705). If the minimal degradation characteristic fx is obtained, the CPU 151 calculates a frequency characteristic rx of a recovery filter (S706) by:

$$rx(u)=1/fx(u) \qquad (3)$$

The CPU 151 calculates a recovery filter Rx by performing inverse Fourier transform for the frequency characteristic rx of the recovery filter (S707), and stores the calculated recovery filter Rx in the parameter holding unit 105 in association with the filter number (S708). Note that if the recovery processing in step S204 is performed in the frequency space, the frequency characteristic rx of the recovery filter Rx is stored in the parameter holding unit 105 in association with the filter number.

Furthermore, it is known that if the recovery processing is performed in a high frequency range, noise increases and the brightness decreases. To cope with this, for example, in the frequency range exceeding the visual limit frequency, in which the sensitivity is low because of the visual characteristic, a recovery amount may be reduced by limiting the value of rx(u) to a small value or the recovery processing is not substantially executed by setting rx(u)=1.

As described above, a recovery filter to be used for sharpness recovery processing is commonly generated for output conditions under which the frequency characteristics of the output image can be considered to be almost the same. At this time, whether the frequency characteristics are almost the same is determined by paying attention to a frequency range (for example, the important range below the visual limit frequency) which is visually important and in which sharpness degradation is readily perceived.

A common recovery filter is created not to perform excessive recovery processing under all the corresponding output conditions. In such recovery filter creation method, it is possible to appropriately perform sharpness recovery processing by suppressing the memory capacity of the parameter holding unit 105 without preparing recovery filters for all combinations of the items of the output condition. In other words, if the sharpness degradation characteristics of the image can be considered to be visually almost the same, the same recovery processing parameter can be used for sharpness recovery processing and, for example, it becomes unnecessary to hold recovery processing parameters for all combinations of the items of the output condition.

Second Embodiment

Image processing and information processing according to the second embodiment of the present invention will be described below. Note that in the second embodiment, the same reference numerals as those in the first embodiment denote the same components and a detailed description thereof may be omitted.

The second embodiment will describe an example in which when obtaining a recovery filter, recovery filters are searched using association LUTs having a hierarchical structure from an item of an output condition which is expected to largely affect sharpness degradation in the important range.

The first embodiment has described an example in which one association LUT is used to associate an output condition and a recovery filter. However, the degree of influence on sharpness degradation in the important range is different depending on each item of the output condition, such as a pass count, carriage speed, and print medium. For example, if the print medium is different, sharpness degradation in the important range largely changes. However, even if the pass count is changed, sharpness degradation in the important range is estimated not to largely change. Therefore, if items (for example, the print medium and the presence/absence of the use of CL ink) of the output condition, which largely affect sharpness degradation in the important range, are determined, a frequency characteristic in the important range is determined within the range in which frequency characteristics are almost the same at high probability regardless of the settings of the remaining items.

The association LUT described in the first embodiment includes a record for each of the plurality of output conditions under which frequency characteristics in the important range are almost the same, and the number of records (the number of rows of the table shown in FIG. 3, which corresponds to the memory capacity) of the association LUT increases accordingly. For example, referring to FIG. 3, the same recovery filter corresponds to the output conditions O1 to O6 but the memory capacity for six rows is necessary for association of the same recovery filter. In other words, the association LUT described in the first embodiment stores information which can be reduced. Accordingly, the memory capacity necessary for the parameter holding unit 105 increases or the memory capacity of the parameter holding unit 105 is consumed.

The second embodiment will describe a method of suppressing an increase in or consumption of the memory capacity of a parameter holding unit 105 caused by the number of records of an association LUT. That is, the number of records of the association LUT is suppressed by preparing association LUTs for the items of an output condition from an item which has a larger influence on sharpness degradation in the important range, and forming the hierarchy of the plurality of association LUTs.

In recent years, printers of resolutions higher than 300 dots/inch (dpi) have become widespread. Such a high-resolution printer has performance in which the dot size of one ink droplet is 30 µm or less and the landing accuracy is 10 µm or less, and has a relatively small influence on sharpness degradation (mechanical dot gain) caused by a mechanical change. On the other hand, an optical sharpness degradation (optical dot gain) determined by the type of print medium and the like is caused by light diffusion in the print medium, and relatively largely affects sharpness degradation in the low frequency range. In other words, in the low frequency range, the optical dot gain caused by light diffusion in the print medium is more dominant than the mechanical dot gain caused by driving of the printer.

Light diffusion in the print medium is determined mainly based on the thickness of a receptive layer, the particle size of a receptor material, and the refractive index of the surface of the print medium. Therefore, the type of print medium and the presence/absence of the use of CL ink largely affect sharpness degradation in the important range. Furthermore, since the thickness of the receptive layer and the particle size of the receptor material relatively more largely affect sharpness degradation than the refractive index of the surface of the print medium, the hierarchy of association LUTs is formed by prioritizing an association LUT related to the type of print medium over an association LUT related to the presence/absence of the use of CL ink.

FIGS. 10A and 10B each show an example of an association LUT according to the second embodiment. FIG. 10A shows an association LUT of the first layer related to the type of print medium, in which the number of an association LUT of the second layer or a filter number is assigned to each symbol A, B, C, . . . indicating the type of print medium. Note that, for example, the model number of a print medium can be used as a symbol indicating the type of print medium. The association LUT of the first layer will be referred to as a "parent association LUT" hereinafter and the association LUT of the second layer or lower layer will be referred to as a "descendant association LUT" hereinafter.

For the print medium C assigned with a filter number, a recovery filter is confirmed using only the parent association LUT. In other words, the print medium C indicates a print medium for which the settings of the remaining items of the output condition have a small influence on sharpness degradation in the important range or a print medium for which the remaining items of the output condition cannot be changed (the remaining items of the output condition are fixed).

Note that "a small influence on sharpness degradation in the important range" means that determination of whether the frequency characteristics are almost the same in step S505 remains unchanged. The fact that the remaining items of the output condition are fixed indicates, for example, a case in which only a specific mode can be set to avoid ink from overflowing on plain paper. In addition, even if CL ink is printed on art paper, the CL ink penetrates and thus it is impossible to obtain a gloss effect. Consequently, it is impossible to set "the use of CL ink" for art paper.

On the other hand, for each of the print media A and B assigned with the number of the descendant association LUT, the frequency characteristic in the important range can change in accordance with the setting of an item other than the print medium, and thus a recovery filter is not confirmed using only the parent association LUT. FIG. 10B shows an example of the descendant association LUT, in which the number of a descendant association LUT or a filter number is assigned to the presence/absence of the use of CL ink. That is, if a recovery filter is confirmed in accordance with the presence/absence of the use of CL ink, the filter number of the recovery filter is assigned. If the frequency characteristic in the low frequency range can change in accordance with the setting of another item of the output condition, the number of a descendant association LUT is assigned.

As described above, for example, until a filter number is assigned by starting with the print medium, the hierarchy of association LUTs for the respective items of the output condition is created, and the association LUTs are stored in the parameter holding unit 105.

In step S203, a filter selection unit 106 accesses the parent association LUT in the parameter holding unit 105. If a filter number is assigned to the number of the print medium indicated by each output condition, the filter selection unit 106 obtains a corresponding recovery filter. If the number of the descendant association LUT is assigned to the number of the print medium indicated by each output condition, the filter selection unit 106 accesses the descendant association LUT to obtain a filter number or the number of the descendant association LUT.

In consideration of the hierarchy of the association LUTs, it is preferable to make settings from an item of the output condition, which has a larger influence on sharpness degradation in the important range. FIG. 11 shows an example of a UI preferable for the association LUTs having the hierarchical structure. FIG. 11 shows a UI example in which an item of the output condition that has a larger influence on sharpness degradation in the important range is displayed in an upper portion of the UI. By disabling setting of an item below an item which is not yet set so that the user sequentially sets the respective items from the top, user settings are made from an item which has a larger influence on sharpness degradation in the important range. Note that setting of items from an item which has a larger influence on sharpness degradation in the important range need only be implemented, and UIs each for setting one item may be sequentially provided in this order.

As described above, the hierarchy of association LUTs is formed based on the degrees of influence of the items of the output condition on sharpness degradation in the important range. By eliminating the records of the association LUTs for the items of the output condition after the item for which a recovery filter is confirmed, it is possible to attempt to suppress the memory capacity necessary for the parameter holding unit 105 or reduce the consumption of the memory of the parameter holding unit 105.

Third Embodiment

Image processing and information processing according to the third embodiment of the present invention will be described below. Note that in the third embodiment, the same reference numerals as those in the first and second embodiments denote the same components and a detailed description thereof may be omitted.

In the first and second embodiments, the output condition is used as information for selecting a recovery filter or information (to be referred to as "degradation characteristic determination information" hereinafter) for determining a sharpness degradation characteristic. Recovery processing using a common recovery filter for output conditions under which sharpness degradation characteristics in the important range can be considered to be almost the same is performed using the association LUT for associating each output condition with a recovery filter.

However, sharpness degradation of an output image is affected by not only the output condition but also a change in light when viewing the output image. For example, as the angle and direction of a light source with respect to the output image change, the shape, direction, and size of the influence range of an optical dot gain change. If a viewing condition (the position of a viewing light source, the viewpoint position of a viewer, and the like) is determined, for example, if the output image is placed on a wall, recovery processing meeting the viewing condition is preferably performed.

The third embodiment will describe processing of creating an association LUT using, as degradation characteristic determination information, the direction and angle (to be referred to as a "light source condition" hereinafter) of a viewing light source with respect to an output image in addition to an output condition. If sharpness degradation characteristics in the important range can be considered to be almost the same with respect to output conditions and sharpness degradation characteristics in the important range can be considered to be almost the same with respect to light source conditions, association of a common recovery filter is performed.

Figure 12A:
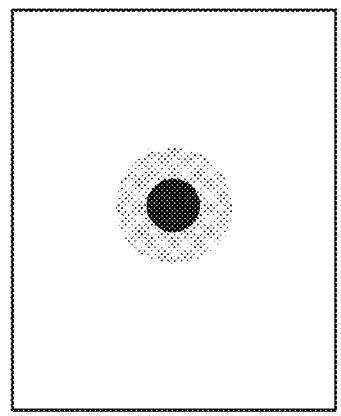
FIGS. 12A to 12C are views each showing a change example of sharpness degradation when the angle and direction of a light source with respect to an image are changed.
Figure 12B:
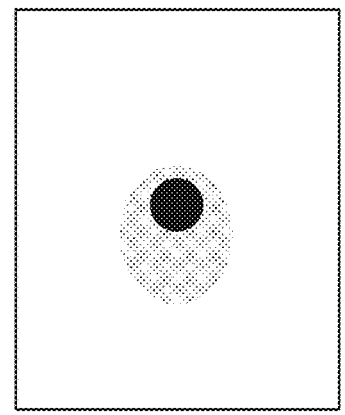
Figure 12C:
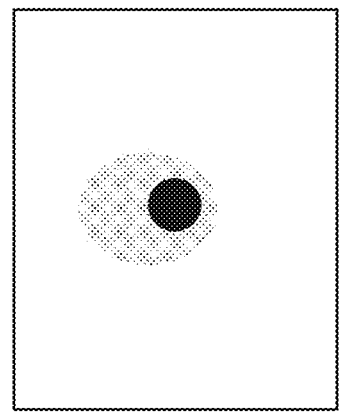

FIGS. 12A to 12C show change examples of sharpness degradation when the angle and direction of a light source with respect to an image are changed. Light entering the output image diffuses in the print medium of the image, and the sharpness of the image is affected in accordance with the position of the light source. At this time, if the incident angle and direction of light change, the diffusion direction of the light also changes, and thus anisotropy appears in sharpness degradation. FIG. 12A shows sharpness degradation if the light source is in front of the image. FIG. 12B shows sharpness degradation if the incident direction of light is tilted by 45 degree upward with respect to the normal to the image plane. FIG. 12C shows sharpness degradation if the incident direction of light is tilted by 45 degree rightward with respect to the normal to the image plane. Since anisotropy appears in sharpness degradation in accordance with the light source condition, it is necessary to give anisotropy to a recovery filter.

[Overview of Image Processing]

FIG. 13 is a flowchart for explaining an overview of processing in an image processing apparatus 100 according to the third embodiment. A recovery processing unit 107 inputs image data i as an image forming target from an information processing apparatus 150 or the like through a data I/O 104, and stores the input image data i in a memory unit 101 such as a RAM (S1201).

Figure 15:
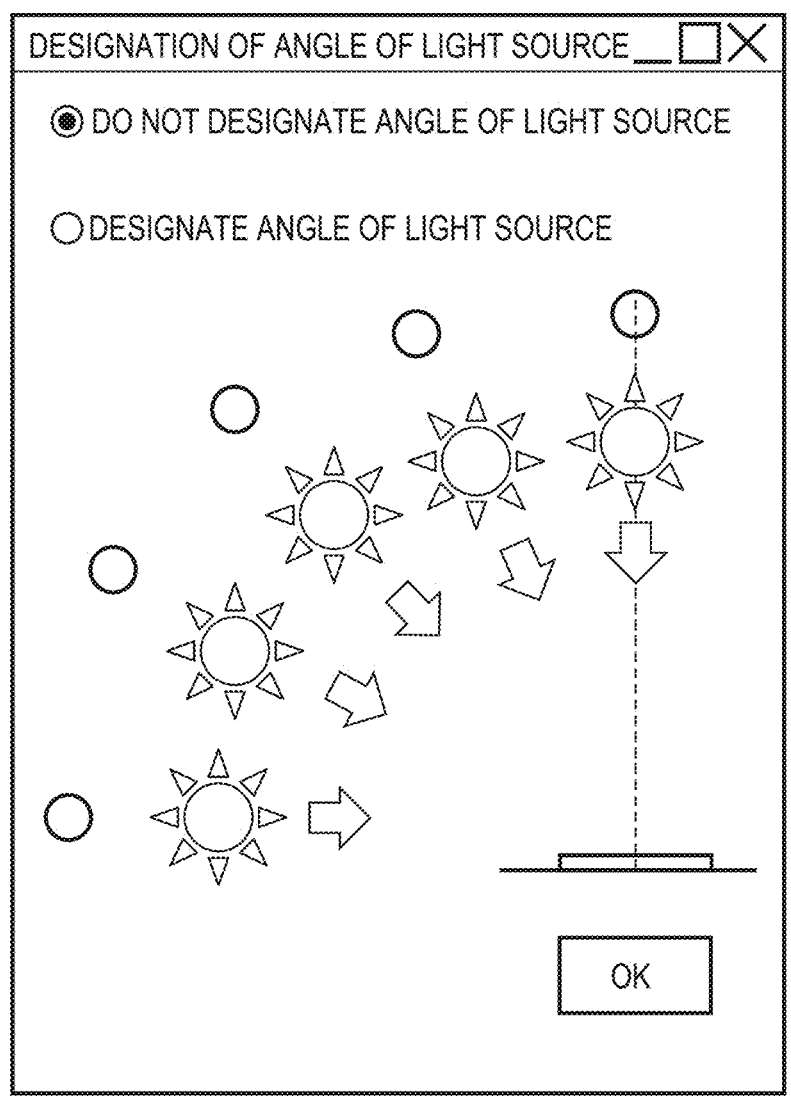
FIG. 15 is a view showing an example of a UI for designating an angle La of the light source.

Through a UI unit 102 or from the information processing apparatus 150, a condition obtaining unit 103 obtains an output condition Oi of an image forming unit 108 (S1202), obtains a direction Ld of the light source (S1203), and obtains an angle La of the light source (S1204). FIG. 14 shows an example of a UI for designating the direction Ld of the light source. FIG. 15 shows an example of a UI for designating the angle La of the light source. Note that FIGS. 14 and 15 respectively show the UIs for roughly designating the direction and angle on a screen. However, UIs for inputting the direction and angle by numerical values may be used.

Next, a filter selection unit 106 accesses an association LUT held in a parameter holding unit 105 to obtain a recovery filter Ri corresponding to the output condition Oi, the direction Ld of the light source, and the angle La of the light source (S1205). The recovery processing unit 107 executes sharpness recovery processing for the input image data i using the recovery filter Ri, and stores image data i' after the recovery processing in the memory unit 101 (S1206). Under the output condition Oi, the image forming unit 108 forms, on a print medium 208, an image represented by the image data i' after the recovery processing (S1207).

[Association LUT Including Light Source Condition]

FIG. 16 shows an example of the association LUT according to the third embodiment. The association LUT according to the third embodiment stores the filter number of a recovery filter in correspondence with the light source condition (the direction and angle of the light source) in addition to the respective items of the output condition shown in FIG. 3. Similarly to the first embodiment, in addition to the output condition, a frequency response value in the important range is measured for each combination of the direction and angle of the light source. If the maximum value (or average value) of the differences between the response values is smaller than a predetermined value, it is determined that frequency characteristics are almost the same, and association of the same recovery filter is performed. Note that measurement of a frequency response value according to the third embodiment is performed by shooting a sharpness evaluation chart for each combination of the direction and angle of the light source shown in FIGS. 14 and 15.

As shown in FIGS. 12B and 12C, in a general print medium, the diffusion direction of light changes in accordance with the direction of the light source, but the diffusion shape hardly changes as long as the angle of the light source is constant. Therefore, in terms of the memory capacity, it is preferable to set, for each angle of the light source, a common recovery filter to be stored in the parameter holding unit 105. In this case, a difference caused by the direction of the light source is absorbed by rotating an array of filter coefficients by a predetermined angle at the time of, for example, obtaining of a recovery filter or recovery processing.

Referring to FIG. 16, filter information 1 (45°) indicates the use of a recovery filter obtained by rotating the array of the filter coefficients of the recovery filter of filter information 1 (0°) clockwise by 45 degree. If sharpness degradation characteristics are almost the same even though the light conditions are different, recovery processing may be performed without rotating the array of the filter coefficients.

Note that whether the frequency characteristics are almost the same is determined based on the frequency response values in the important range, which are obtained using the sharpness measurement chart shown in FIG. 6. If the output conditions and light source conditions are different, when the maximum value (or average value) of the differences between the response values in the important range is equal to or smaller than the predetermined value, the frequency characteristics are considered to be almost the same regardless of a stripe direction. Therefore, the sharpness measurement chart used in the third embodiment includes spatial frequency patterns having different stripe directions. Patterns having stripe directions orthogonal to each other at the same spatial frequency are preferably included as spatial frequency patterns having different stripe directions.

If no light source condition is designated, recovery processing is performed using a light source condition in a general-purpose viewing environment. In this case, whether frequency characteristics are almost the same is determined based on the light source condition in the general-purpose viewing environment. In the general-purpose viewing environment, to prevent anisotropy from appearing, for example, a light source is arranged in a hemispherical shape in front of the image, a light source is arranged in a ring in a direction of 45 degree with respect to the normal to the image plane, or a point light source is arranged above the image in a direction of 45 degree with respect to the normal to the image plane.

As described above, it is possible to perform recovery processing for sharpness degradation caused by the light source condition at the time of viewing by preparing a recovery filter in consideration of the light source condition when viewing the output image.

Fourth Embodiment

Image processing and information processing according to the fourth embodiment of the present invention will be described below. Note that in the fourth embodiment, the same reference numerals as those in the first to third embodiments denote the same components and a detailed description thereof may be omitted.

The first to third embodiments have described the method of using, for recovery processing, a common recovery filter with respect to the output conditions and light source conditions under which the sharpness degradation characteristics in the important range can be considered to be almost the same by using the association LUT. However, in such method, it is impossible to perform appropriate recovery processing for an output condition which does not exist in the association LUT, for example, a print medium unregistered in the association LUT.

Furthermore, it may be considered to suppress the memory capacity of the parameter holding unit 105 by holding in advance, in the parameter holding unit 105, a plurality of recovery filters corresponding to output conditions for which it is desirable to precisely create recovery filters whose use frequency is high or whose grade is highest. In this case, it is necessary to select an appropriate recovery filter from the recovery filters held in the parameter holding unit 105 for an output condition for which precise creation is not essential.

To solve the above problem, a specific frequency pattern is output under an output condition as a recovery filter selection target, and the frequency response value of the output pattern is obtained. Based on the obtained frequency response value, a recovery filter with which no excessive recovery processing is performed and the effect of recovery processing is high is selected. Processing of selecting a recovery filter according to the fourth embodiment will be described below.

[Arrangement of Apparatus]

A frequency response obtaining unit 211 shown in FIG. 1 causes an image forming unit 108 to form the measurement chart of a specific frequency pattern under an output condition as a recovery filter selection target. Using the same measurement apparatus as in the first embodiment, information (for example, a luminance value, a density value, a refractive index, or information which can be converted into them) necessary to calculate a frequency response value is obtained from the measurement chart, thereby selecting a recovery filter to be applied to the target output condition.

Note that the frequency response obtaining unit 211 may be implemented when a program for executing processes (S1703 to S1709) (to be described later) of the frequency response obtaining unit 211 is supplied to an information processing apparatus 150, and a CPU 151 executes the program.

[Image Processing]

Figure 17:
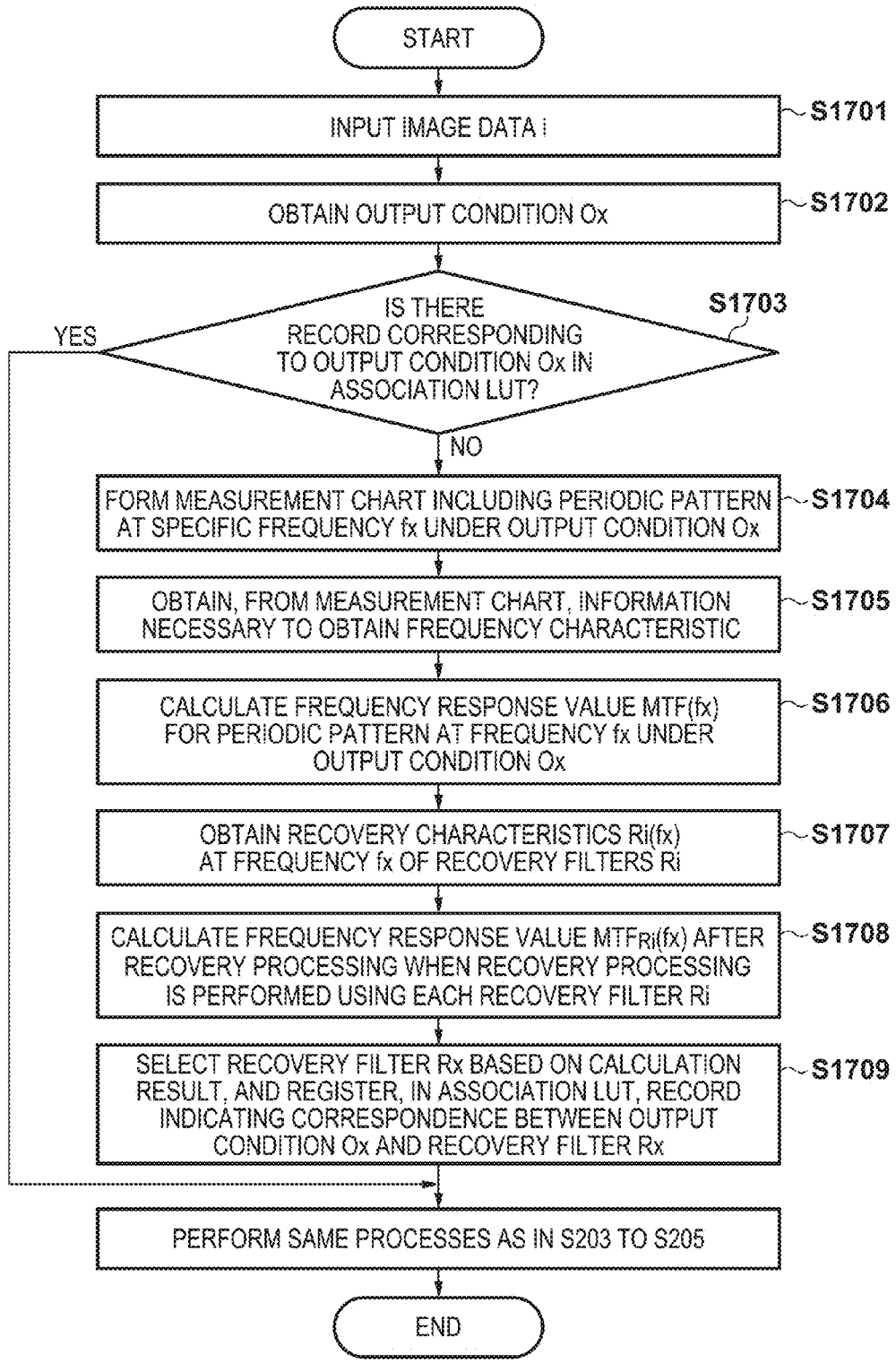
FIG. 17 is a flowchart for explaining processing in an image processing apparatus according to the fourth embodiment.

FIG. 17 is a flowchart for explaining processing in an image processing apparatus 100 according to the fourth embodiment. A recovery processing unit 107 inputs image data i as an image forming target from the information processing apparatus 150 or the like through a data input/output unit (data I/O) 104, and stores the input image data i in a memory unit 101 such as a RAM (S1701).

A condition obtaining unit 103 obtains an output condition Ox of the image forming unit 108 through a UI unit 102 or from the information processing apparatus 150 (S1702). A frequency response obtaining unit 211 determines whether a record corresponding to the output condition Ox exists in an association LUT held in the parameter holding unit 105 (S1703). If a record corresponding to the output condition Ox exists in the association LUT, subsequent processes are the same as those in steps S203 to S205 of FIG. 2 and a detailed description thereof will be omitted. Processing when no record corresponding to the output condition Ox exists in the association LUT will be described below.

The frequency response obtaining unit 211 supplies, to the image forming unit 108, image data of a measurement chart including a periodic pattern at a specific frequency fx [cycles/mm] read out from a parameter holding unit 105, and causes the image forming unit 108 to form the measurement chart on a print medium under the output condition Ox (S1704).

Figure 18:
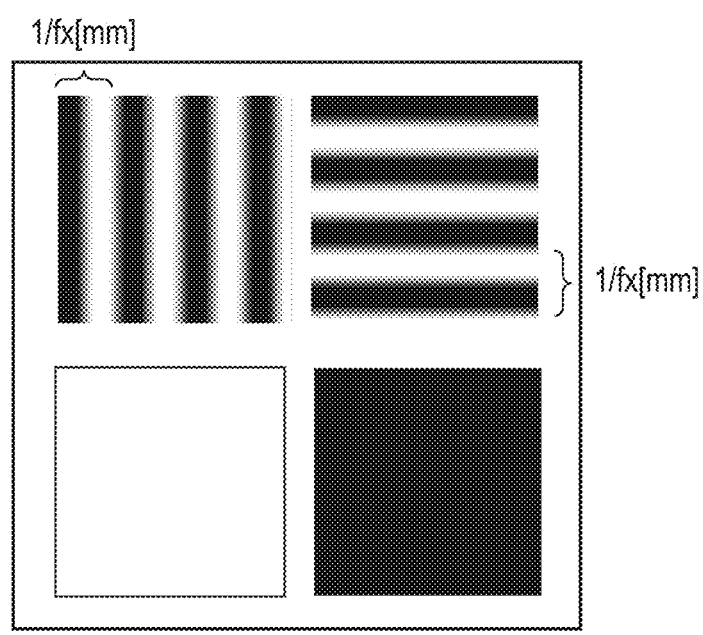
FIG. 18 is a view showing an example of the measurement chart of a specific frequency pattern.

FIG. 18 shows an example of the measurement chart of the specific frequency pattern. The measurement chart shown in FIG. 18 includes a plurality of sinusoidal wave patterns and uniform patterns, similarly to the measurement chart shown in FIG. 6. The spatial frequencies of the sinusoidal wave patterns are all equal to a specific frequency fx.

The frequency response obtaining unit 211 obtains, from the measurement chart, information necessary to obtain a frequency characteristic (S1705). Note that the frequency response obtaining unit 211 may obtain information input from the information processing apparatus 150, or obtain the information from a scanner if the image processing apparatus 100 includes the scanner.

The frequency response obtaining unit 211 calculates a frequency response value for the periodic pattern at the frequency fx under the output condition Ox based on the information obtained from the measurement chart (S1706). Note that MTF(fx) described in the first embodiment or a CTF value using a rectangular wave as a periodic pattern can be used as a frequency response value.

The frequency response obtaining unit 211 obtains recovery characteristics Ri(fx) at the frequency fx of recovery filters Ri held in the parameter holding unit 105 (S1707). For example, the parameter holding unit 105 holds a list of the recovery characteristics Ri(fx) at the frequency fx of the recovery filters Ri, and the frequency response obtaining unit 211 reads out the recovery characteristics Ri(fx) in accordance with filter numbers.

If recovery processing is performed using each recovery filter Ri, the frequency response obtaining unit 211 calculates a frequency response value $MTF_{Ri}(fx)$ after the recovery processing (S1708) by:

$$MTF_{Ri}(Fx) = MTF(Fx) \times Ri(Fx) \quad (4)$$

If a frequency characteristic G(fx) at the specific frequency fx is not corrected in the measurement apparatus for measuring the measurement chart, the frequency response value $MTF_{Ri}(fx)$ is calculated using equation (5) below for cancelling the frequency characteristic G(fx). The frequency characteristic G(fx) is, for example, stored in advance in the parameter holding unit 105 or obtained from the information processing apparatus 150.

$$MTF_{Ri}(fx) = MTF(fx) \times Ri(fx)/G(fx) \quad (5)$$

The frequency response obtaining unit 211 selects, as a recovery filter Rx, the recovery filter Ri corresponding to $MTF_{Ri}(fx)$ whose calculation result is equal to or smaller than 1 and is closest to 1. A record indicating the correspondence between the output condition Ox and the recovery filter Rx is registered in the association LUT (S1709). Subsequent processes are the same as those in steps S203 to S205 of FIG. 2 and a detailed description thereof will be omitted.

The correspondence between the output condition Ox and the recovery filter Rx may be stored in a table different from the association LUT. In this case, determination in step S1703 and obtaining of a recovery filter by a filter selection unit 106 in step S203 are performed with reference to this table in addition to the association LUT.

As described above, if the frequency characteristic after the recovery processing exceeds 1, the recovery processing turns to enhancement processing, and the excessive recovery processing causes an adverse effect such as enhancement of noise, a decrease in brightness, and occurrence of ringing. Thus, the recovery filter Ri for which the calculation result of $MTF_{Ri}(fx)$ does not exceed 1 (no excessive recovery processing is performed) and is closest to 1 (the effect of recovery processing is high) is selected as the recovery filter Rx.

Figure 19A:
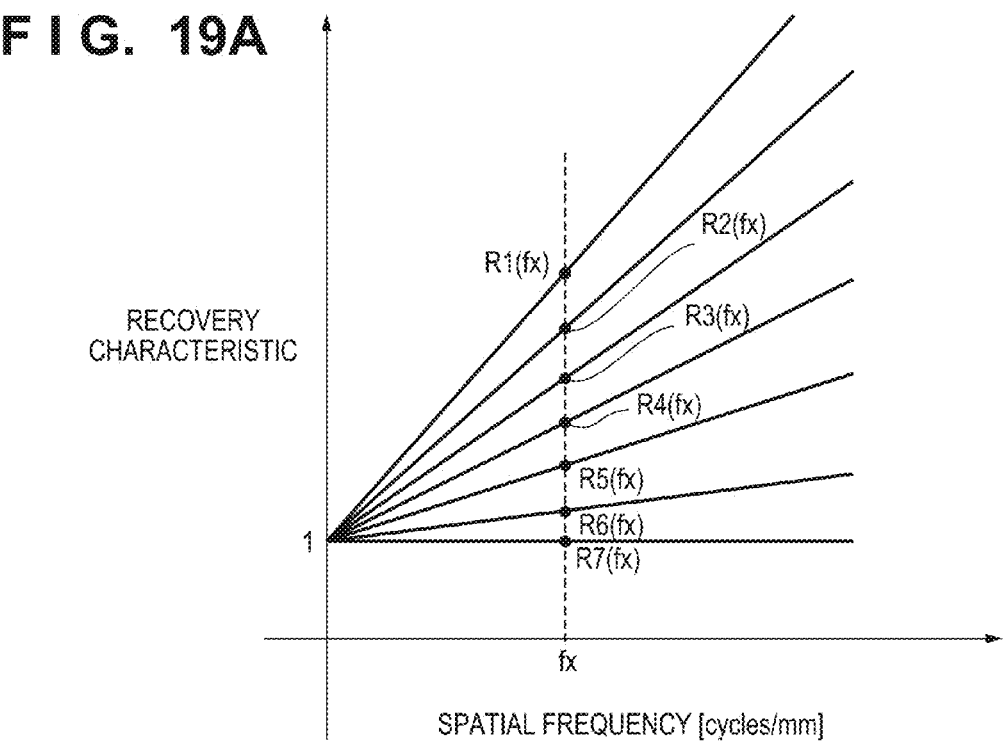
FIGS. 19A and 19B are graphs for explaining selection of a recovery filter and frequency response values after recovery processing.
Figure 19B:
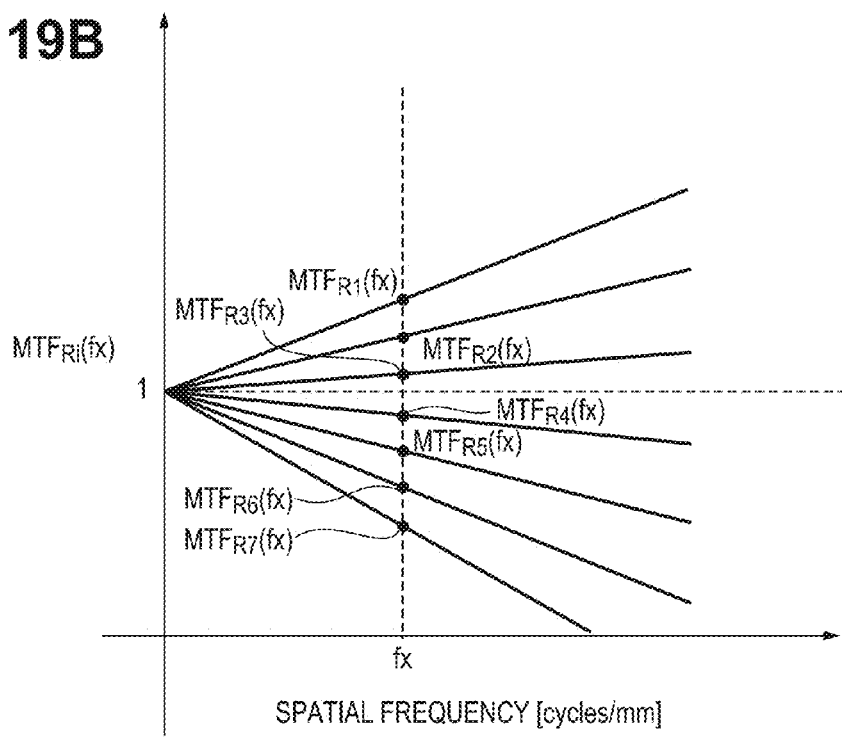

Selection of the recovery filter and the frequency response values $MTF_{Ri}(fx)$ after the recovery processing will be described with reference to FIGS. 19A and 19B. Referring to FIGS. 19A and 19B, the abscissa represents the spatial frequency [cycles/mm], the ordinate represents the recovery characteristic, and a broken line indicates the specific frequency line fx. FIG. 19A shows examples of the characteristics of the recovery filters Ri held in the parameter holding unit 105, in which the intersection points of the broken line and the recovery characteristics of the recovery filters Ri indicate a list of the recovery characteristics Ri(fx) of the recovery filters Ri held in the parameter holding unit 105.

FIG. 19B shows examples of the frequency response values $MTF_{Ri}(fx)$ after the recovery processing, in which the frequency response value $MTF_{Ri}(fx)$ which is equal to or smaller than 1 and closest to 1 is $MTF_{R4}(fx)$. In this example, a recovery filter R4 corresponding to $MTF_{R4}(fx)$ is selected as the recovery filter Rx.

Note that the reciprocals 1/Ri(fx) of the recovery characteristics may be compared with the frequency response value MTF(fx) in step S1708 without calculating the frequency response values $MTF_{Ri}(fx)$ after the recovery processing in step S1707. In this case, a list of the reciprocals 1/Ri(fx) of the recovery characteristics at the specific frequency fx of the recovery filters Ri is stored in the parameter holding unit 105. The recovery filter Ri corresponding to 1/Ri(fx) which is equal to or larger than MTF(fx) and closest to MTF(fx) is selected as the recovery filter Rx.

FIGS. 19A and 19B show an example in which seven recovery filters R1 to R7 exist. In the fourth embodiment, however, it is only necessary to hold two or more recovery filters in the parameter holding unit 105, and hold, in the parameter holding unit 105, recovery filters corresponding to output conditions for which it is desirable to precisely create recovery filters whose use frequency is high or whose grade is highest. Alternatively, in application to various assumed output conditions, a recovery filter with which the sum of errors becomes minimum may be held in the parameter holding unit 105.

To surely avoid excessive recovery processing, it is preferable to store, in the parameter holding unit 105, a recovery filter whose recovery characteristic is 1 (which has a filter coefficient of 1 at the center and other filter coefficients of 0), regardless of the frequency, like the recovery filter R7 shown in FIG. 19A. A recovery filter whose recovery characteristic is 1 need not be included, and if $MTF_{Ri}(fx)>1$ for all the recovery filters Ri, the recovery processing (S204) need not be performed to avoid excessive recovery processing, as a matter of course.

As described above, to select the recovery filter Rx in a region in which the visual sensitivity is high and noise or a decrease in brightness in an output of a printer is small, the specific frequency fx is set to a spatial frequency in the important range (below the visual limit frequency). Furthermore, an example in which the recovery Rx is selected based on the frequency response value MTF(fx) at the specific frequency fx has been explained. However, the recovery filter Rx may be selected based on frequency response values MTF(fm) to MTF(fn) at a plurality of frequencies fm to fn in the important range.

A scanner, digital camera, microscope, microdensitometer, or the like is used to input information necessary to obtain a frequency characteristic. Instead, however, the user may input information associated with sharpness in the important range. For example, the user may input the frequency response value MTF(fx) at the specific frequency, or information of a print medium which has a large influence on a frequency characteristic in the low frequency range. Examples of information of the print medium are the category (gloss paper, art paper, or the like) of the print medium, the thickness of the print medium, the presence/absence of a receptive layer, a grammage, and whiteness.

Fifth Embodiment

Image processing and information processing according to the fifth embodiment of the present invention will be described below. Note that in the fifth embodiment, the same reference numerals as those in the first to fourth embodiments denote the same components and a detailed description thereof may be omitted.

The fourth embodiment has described the example in which the measurement chart of the specific frequency pattern is formed to select a recovery filter, and a recovery filter to be applied to a target output condition is selected based on frequency response values calculated based on information of the measurement chart. However, information (mechanical dot gain or optical dot gain) in a real space can be used as information for selecting a recovery filter. That is, the influence range of a dot gain can be used as degradation characteristic determination information. The influence range of a dot gain is measured, and a recovery filter corresponding to an output condition under which the difference between influence ranges is equal to or smaller than a predetermined value is selected.

[Arrangement of Apparatus]

An influence range obtaining unit 212 shown in FIG. 1 causes an image forming unit 108 to form a dot pattern under an output condition as a recovery filter selection target. Using the same measurement apparatus as in the first embodiment, information (for example, a luminance value, a density value, a refractive index, or information which can be converted into them) necessary to obtain the influence range of a dot gain is obtained from the dot pattern, thereby selecting a recovery filter to be applied to the target output condition.

Note that the influence range obtaining unit 212 may be implemented when a program for executing processes (S1803 to S1811) (to be described later) of the influence range obtaining unit 212 is supplied to an information processing apparatus 150, and the CPU 151 executes the program.

[Image Processing]

Figure 20A:
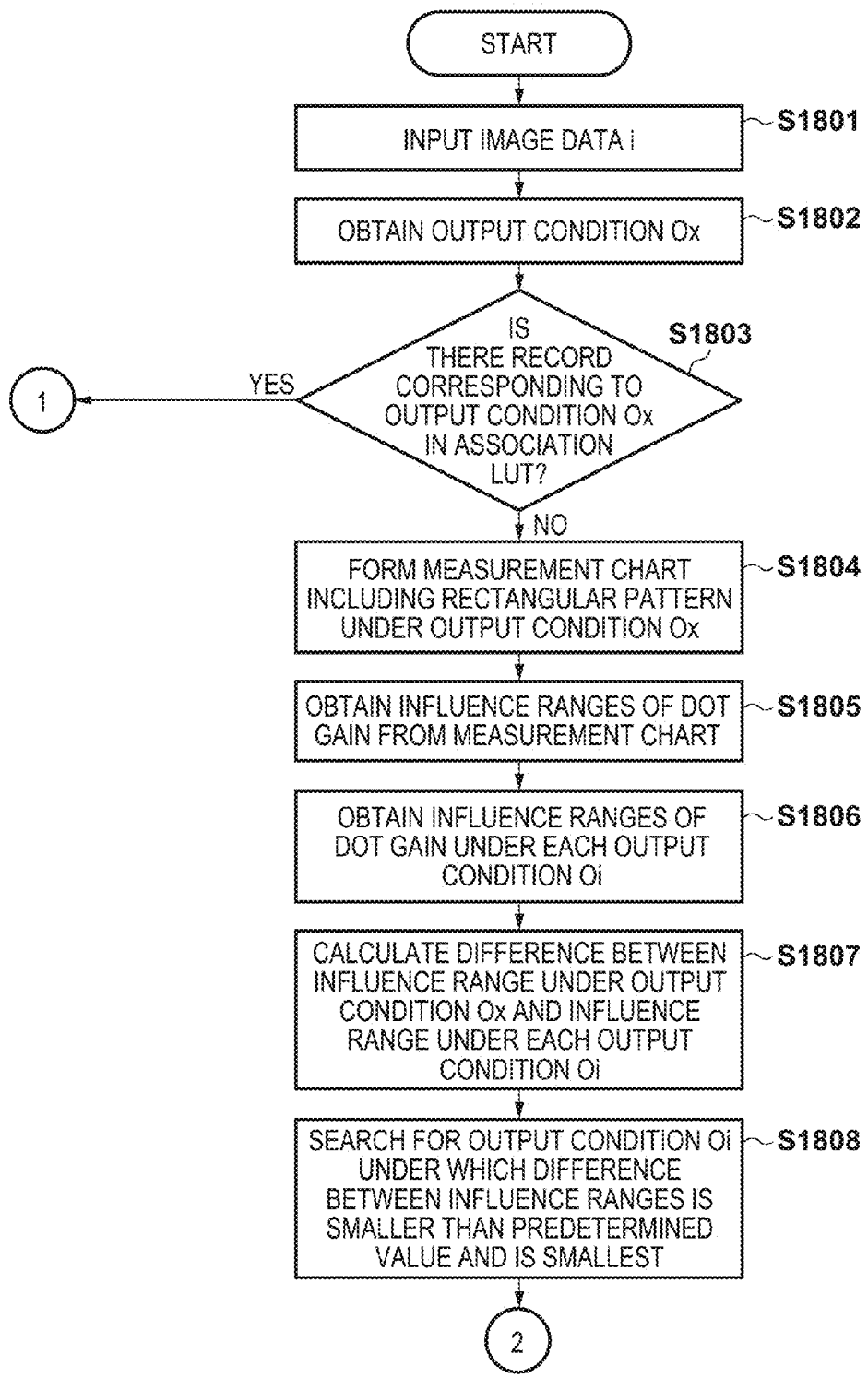

FIGS. 20A and 20B are flowcharts for explaining processing in an image processing apparatus 100 according to the fifth embodiment. A recovery processing unit 107 inputs image data i as an image forming target from the information processing apparatus 150 or the like through a data input/output unit (data I/O) 104, and stores the input image data i in a memory unit 101 such as a RAM (S1801).

A condition obtaining unit 103 obtains an output condition Ox of an image forming unit 108 through a UI unit 102 or from the information processing apparatus 150 (S1802). The influence range obtaining unit 212 determines whether a record corresponding to the output condition Ox exists in an association LUT held in a parameter holding unit 105 (S1803). If a record corresponding to the output condition Ox exists in the association LUT, subsequent processes are the same as those in steps S203 to S205 of FIG. 2 and a detailed description thereof will be omitted. Processing when no record corresponding to the output condition Ox exists in the association LUT will be described below.

Figure 21A:
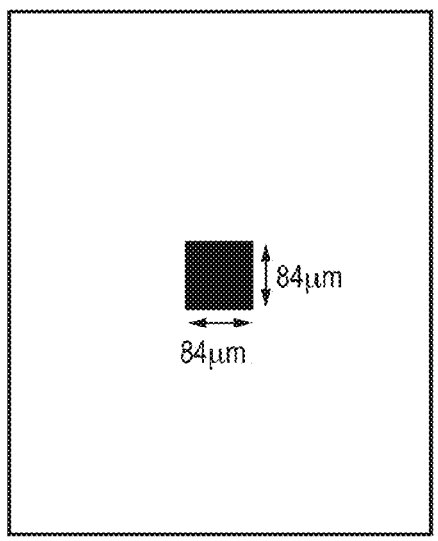
FIGS. 21A to 21C are views showing examples of the measurement chart of a rectangular pattern and the influence ranges of a dot gain.
Figure 21B:
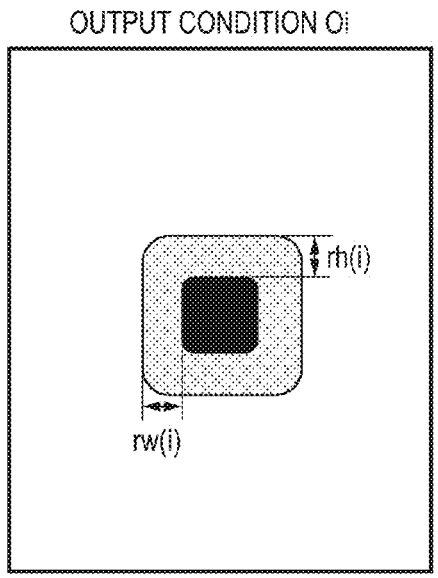
Figure 21C:
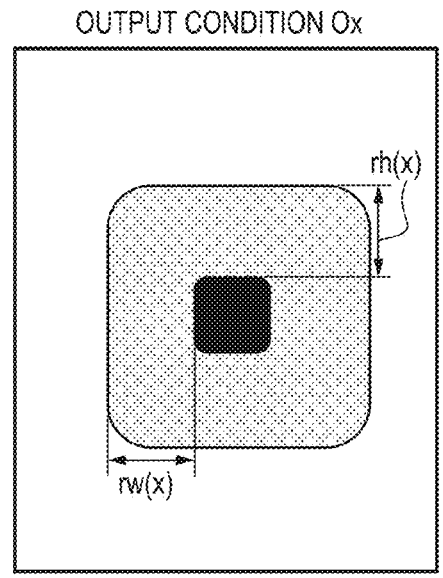

The influence range obtaining unit 212 supplies, to the image forming unit 108, image data of a measurement chart including a rectangular pattern read out from the parameter holding unit 105, and causes the image forming unit 108 to form the measurement chart on a print medium under the output condition Ox (S1804). FIGS. 21A to 21C show examples of the measurement chart of the rectangular pattern and the influence ranges of a dot gain. The measurement chart shown in FIG. 21A has a size of, for example, 84×84 μm (2×2 dots for 600 dpi or 4×4 dots for 1,200 dpi).

The influence range obtaining unit 212 obtains influence ranges rw(x) and rh(x) of a dot gain from the measurement chart (S1805). Note that the influence range obtaining unit 212 may obtain influence ranges input from the information processing apparatus 150, or obtain influence ranges based on information input from a scanner when the image processing apparatus 100 includes the scanner.

As shown in FIG. 21C, the influence ranges rw(x) and rh(x) indicate a spread portion except for the region (84×84 μm) of the rectangular pattern of the measurement chart. That is, the influence range rw(x) indicates a distance from the end portion (or center) of the region (84×84 μm) of the rectangular pattern to a point at which it can be considered that there is no change in density in the horizontal direction (or a point which can be considered to have the same density as that of paper white). Note that the point at which it can be considered that there is no change in density indicates a point which has the same density as that of a point sufficiently far from the rectangular pattern in consideration of a measurement error. Similarly, the influence range rh(x) indicates a distance from the end portion (or center) of the region of the rectangular pattern to a point at which it can be considered that there is no change in density in the vertical direction (or a point which can be considered to have the same density as that of paper white).

The influence range obtaining unit 212 obtains the influence ranges rw(i) and rh(i) of the dot gain under each output condition Oi held in the parameter holding unit 105 (S1806). The influence ranges of the dot gain under each output condition Oi are measured in advance without applying a recovery filter Ri corresponding to each output condition Oi.

The influence range obtaining unit 212 calculates a difference Δr(x, i) between the influence range under the output condition Ox and the influence range under each output condition Oi (S1807) by:

$$\Delta r(x,i)=\sqrt{[\{rw(x)-rw(i)\}^2+\{rh(x)-rh(i)\}^2]} \quad (6)$$

The influence range obtaining unit 212 searches for the output condition Oi under which the difference between the influence ranges is smaller than a predetermined value and is smallest (S1808). That is, the influence range obtaining unit 212 searches for the output condition Oi having a sharpness degradation characteristic which can be considered to be almost the same as that of the output condition Ox and is most similar to it. The predetermined value used for the search is preferably, for example, a converted value of 0.25 mm (250 μm) of a length of 4 cycles/mm which is the upper limit in the important range but is not limited to this.

The influence range obtaining unit 212 determines whether the output condition Oi having the sharpness degradation characteristic which can be considered to be almost the same as that of the output condition Ox has been detected (S1809). If the output condition Oi has been detected, the influence range obtaining unit 212 selects the recovery filter Ri corresponding to the output condition Oi as the recovery filter Rx. A record indicating the correspondence between the output condition Ox and the recovery filter Rx is registered in the association LUT (S1810).

If the output condition Oi having the sharpness degradation characteristic which can be considered to be almost the same as that of the output condition Ox has not been detected, it is necessary to avoid excessive recovery processing. To do this, the influence range obtaining unit 212 displays it on the UI unit 102, and selects, as the recovery filter Rx, the recovery filter R7 whose recovery characteristic shown in FIG. 19A is 1. A record indicating the correspondence between the output condition Ox and the recovery filter Rx is registered in the association LUT (S1811). Subsequent processes are the same as those in steps S203 to S205 of FIG. 2 and a detailed description thereof will be omitted.

Similarly to the fourth embodiment, the correspondence between the output condition Ox and the recovery filter Rx may be stored in a table different from the association LUT. In this case, determination in step S1803 and obtaining of a recovery filter by a filter selection unit 106 in step S203 are performed with reference to this table in addition to the association LUT.

Figure 22:
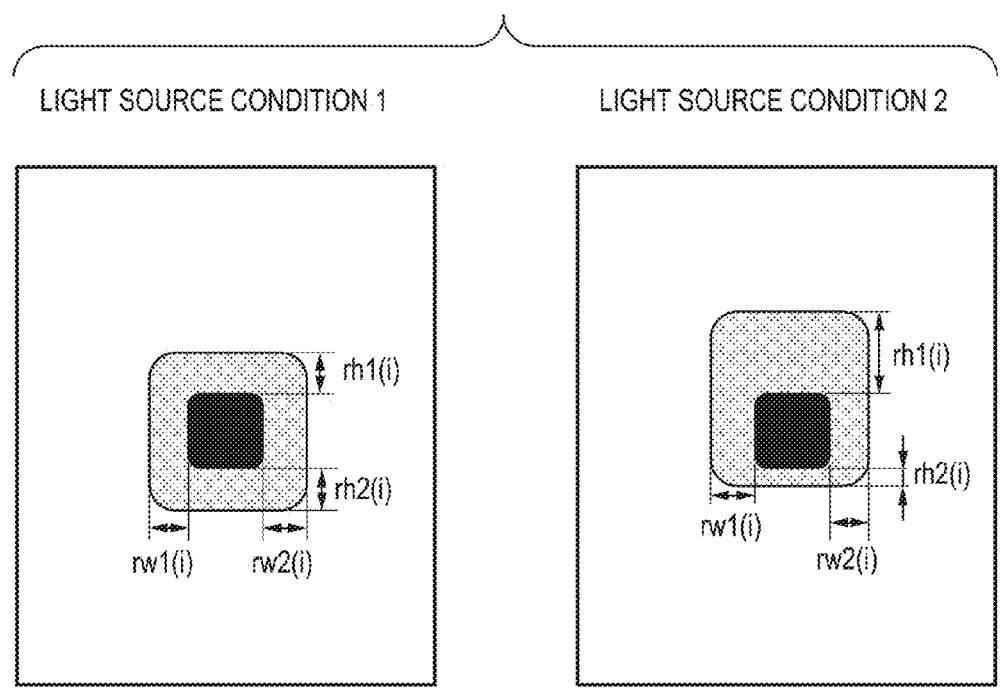
FIG. 22 is a view showing the anisotropy of spread when light source conditions are different.

For the sake of simplicity, determination of whether frequency characteristics are almost the same when output conditions are different has been exemplified. However, determination of whether frequency characteristics are almost the same when light source conditions are different is also possible. Note that if light source conditions are different, the anisotropy of spread appears. FIG. 22 shows the anisotropy of spread when light source conditions are different. In consideration of the anisotropy, $rw1(x)$, $rw2(x)$, $rh1(x)$, and $rh2(x)$ are measured as the influence ranges of a dot gain, as shown in FIG. 22. The output condition Oi under which all the influence ranges are smaller than a predetermined value (for example, 0.25 mm) and the difference Δr(x, i) given by equation (7) below is smaller than the predetermined value is searched for.

$$\Delta r(x,i)=\sqrt{[\{rw1(x)-rw1(i)\}^2+\{rw2(x)-rw2(i)\}^2+\{rh1(x)-rh1(i)\}^2+\{rh2(x)-rh2(i)\}^2]} \quad (7)$$

The influence ranges of the dot gain can be obtained using a chart of thin lines or a chart of edge patterns. Especially, a dot gain caused by a print medium which has a large influence on sharpness degradation can be measured by the spread of impulse light, slit light, or edge light. In other words, the use of the measurement chart of the rectangular pattern is an example of a method of measuring the influence ranges of the dot gain, and measurement of the influence ranges of the dot gain is not limited to the use of the measurement chart of the rectangular pattern.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-073216 filed Mar. 31, 2015, which is hereby incorporated by reference herein in its entirety.

What is claimed is:

1. An image processing apparatus comprising:
   at least one processor; and
   a memory,
   wherein the at least one processor is configured to function as:
      an obtaining unit that obtains determination information to determine a degradation characteristic of sharpness of an image formed by an image forming apparatus;
      a first selection unit that selects one of a plurality of recovery processing parameters used to recover sharpness of an image, based on the determination information, characteristics of the plurality of recovery processing parameters being different from each other; and
      a recovery unit that performs recovery processing of sharpness on image data using the selected recovery processing parameter,
   wherein in a case when the degradation characteristics of sharpness are substantially the same in a low frequency range of the image, the same recovery processing parameter is selected, and
   wherein a common recovery processing parameter is assigned to a plurality of determination information items that is registered to a table and to which it has been determined that the degradation characteristics of sharpness are substantially the same, the table indicating correspondence between the determination information and the plurality of recovery processing parameters.

2. The image processing apparatus according to claim 1, wherein a determination of whether the degradation characteristics of sharpness is substantially the same is performed based on a spatial frequency characteristic of an output image of the image forming apparatus below a spatial frequency in which perception of the sharpness of an image becomes difficult.

3. The image processing apparatus according to claim 1, wherein the obtaining unit obtains an output condition of the image forming apparatus as the determination information.

4. The image processing apparatus according to claim 3, wherein the image forming apparatus forms an image represented by image data after the recovery processing based on the output condition.

5. The image processing apparatus according to claim 1, wherein the first selection unit performs selection of the recovery processing parameter based on the table.

6. The image processing apparatus according to claim 5, wherein the table has a hierarchical structure according to degrees to which items included in the determination information affect the degradation characteristic of the sharpness.

7. The image processing apparatus according to claim 5, wherein the at least one processor is further configured to function as a second selection unit that obtains a spatial frequency characteristic of a pattern formed by the image forming apparatus using an output condition corresponding to the determination information, and chooses one of the plurality of recovery processing parameters based on the spatial frequency characteristic, in a case when the obtained determination information is not registered in the table,
   wherein, in a case when performing the recovery processing on the spatial frequency characteristic using each of the plurality of recovery processing parameters, a value equal to or less than one, and closest to one is obtained as a frequency response value after the recovery processing using the chosen recovery processing parameter, and the first selection unit selects the chosen recovery processing parameter.

8. The image processing apparatus according to claim 5, wherein the at least one processor is further configured to function as a second selection unit that obtains an influence range of dot gain in a pattern formed by the image forming apparatus using an output condition corresponding to the determination information, and chooses one of the plurality of recovery processing parameters based on the influence range, in a case when the obtained determination information is not registered in the table,
   wherein an influence range of dot gain corresponding to each determination information registered on the table is registered to the table, the second selection unit chooses a recovery processing parameter corresponding to the registered determination information in which a difference between the obtained influence range and the registered influence range is equal to or less than a predetermined value, and minimal, and the first selection unit selects the chosen recovery processing parameter.

9. The image processing apparatus according to claim 8, wherein the second selection unit registers correspondence between the obtained determination information and the chosen recovery processing parameter in the table.

10. The image processing apparatus according to claim 1, wherein the obtaining unit obtains, as the determination information, an output condition of the image forming apparatus and light source information in a case when viewing an image formed by the image forming apparatus.

11. The image processing apparatus according to claim 10, wherein the light source information includes at least one of an angle of a light source with respect to the image, or a direction of a light source with respect to the image.

12. An information processing apparatus comprising:
at least one processor; and
a memory,
wherein the at least one processor is configured to function as:
an obtaining unit that obtains a spatial frequency characteristic of a pattern formed by an image forming apparatus based on an output condition; and
a generation unit that generates a table indicating correspondence between the output condition and a plurality of recovery processing parameters for recovering sharpness of an image,
wherein a common recovery processing parameter is assigned to a plurality of output conditions registered to the table and to which it has been determined that degradation characteristics of sharpness are substantially the same in a low frequency range of the image.

13. The information processing apparatus according to claim 12, wherein the generation unit determines whether the degradation characteristics of the sharpness is substantially the same in the low frequency range of the image, based on a spatial frequency characteristic of an output image of the image forming apparatus below a spatial frequency in which perception of the sharpness of an image becomes difficult.

14. The information processing apparatus according to claim 12, wherein the at least one processor is further configured to calculate, as a minimal degradation characteristic, a spatial frequency characteristic having a minimal degradation characteristic of the sharpness from spatial frequency characteristics corresponding to a plurality of output conditions to which the common recovery processing parameter is assigned, and to generate the common recovery processing parameter based on the minimal degradation characteristic.

15. The information processing apparatus according to claim 14, wherein, in a case when there is one output condition to which a recovery processing parameter is assigned, the at least one processor is configured to obtain a spatial frequency characteristic corresponding to the output condition as the minimal degradation characteristic, and to generate the recovery processing parameter based on the minimal degradation characteristic.

16. The information processing apparatus according to claim 14, wherein the at least one processor is configured to generate a recovery processing parameter so as to perform substantially no recovery processing in a spatial frequency range exceeding the spatial frequency in which the perception of the sharpness of an image becomes difficult.

17. An image processing method comprising:
using a processor to perform:
obtaining determination information to determine a degradation characteristic of sharpness of an image formed by an image forming apparatus;
selecting one of a plurality of recovery processing parameters used to recover sharpness of an image, based on the determination information, characteristics of the plurality of recovery processing parameters being different from each other; and
performing recovery processing of sharpness on image data using the selected recovery processing parameter,
wherein in a case when the degradation characteristics of sharpness are substantially the same in a low frequency range of the image, the same recovery processing parameter is selected, and
wherein a common recovery processing parameter is assigned to a plurality of determination information that is registered to a table and to which it has been determined that the degradation characteristics of sharpness are substantially the same, the table indicating correspondence between the determination information and the plurality of recovery processing parameters.

18. An information processing method comprising:
using a processor to perform:
obtaining a spatial frequency characteristic of a pattern formed by an image forming apparatus based on an output condition; and
generating a table indicating correspondence between the output condition and a plurality of recovery processing parameters for recovering sharpness of an image,
wherein a common recovery processing parameter is assigned to a plurality of output conditions registered to the table and to which it has been determined that degradation characteristics of sharpness are substantially the same in a low frequency range of the image.

19. A non-transitory computer readable medium storing a computer-executable program for causing a computer to perform an image processing method, the method comprising:
obtaining determination information to determine a degradation characteristic of sharpness of an image formed by an image forming apparatus;
selecting one of a plurality of recovery processing parameters used to recover sharpness of an image, based on the determination information, characteristics of the plurality of recovery processing parameters being different from each other; and
performing recovery processing of sharpness on image data using the selected recovery processing parameter,
wherein in a case when the degradation characteristics of sharpness are substantially the same in a low frequency range of the image, the same recovery processing parameter is selected, and
wherein a common recovery processing parameter is assigned to a plurality of determination information that is registered to a table and to which it has been determined that the degradation characteristics of sharpness are substantially the same, the table indicating correspondence between the determination information and the plurality of recovery processing parameters.

20. A non-transitory computer readable medium storing a computer-executable program for causing a computer to perform an image processing method, the method comprising:

obtaining a spatial frequency characteristic of a pattern formed by an image forming apparatus based on an output condition; and generating a table indicating correspondence between the output condition and a plurality of recovery processing parameters for recovering sharpness of an image, wherein a common recovery processing parameter is assigned to a plurality of output conditions registered to the table and to which it has been determined that degradation characteristics of sharpness are substantially the same in a low frequency range of the image.

21. The image processing apparatus according to claim 12, wherein the common recovery processing parameter is assigned to the plurality of output conditions to which it has been determined that the degradation characteristics of sharpness are different in a high frequency range of the image.

22. The image processing apparatus according to claim 12, wherein the recovery processing parameter was generated such that a recovery processing on image data using the recovery processing parameter recovers sharpness of an image printed on a recording medium by the image forming apparatus, which is degraded when printed on the recording medium by the image forming apparatus compared to sharpness of an image represented by the image data.

* * * * *